(12) United States Patent
Willows et al.

(10) Patent No.: US 10,517,380 B2
(45) Date of Patent: Dec. 31, 2019

(54) RETAINER

(71) Applicant: Amphipod, Inc., Seattle, WA (US)

(72) Inventors: Keith S. Willows, Seattle, WA (US);
June A. Angus, Seattle, WA (US);
Antonio Del Rosario, Bellevue, WA (US)

(73) Assignee: Amphipod, Inc., Seattle, WA (US)

( * ) Notice: Subject to any disclaimer, the term of this patent is extended or adjusted under 35 U.S.C. 154(b) by 82 days.

(21) Appl. No.: 15/612,233

(22) Filed: Jun. 2, 2017

(65) Prior Publication Data

US 2018/0008032 A1  Jan. 11, 2018

Related U.S. Application Data

(60) Provisional application No. 62/493,556, filed on Jul. 8, 2016.

(51) Int. Cl.
*A45F 5/02* (2006.01)
*F16B 2/00* (2006.01)
*F16B 2/22* (2006.01)

(52) U.S. Cl.
CPC .............. *A45F 5/021* (2013.01); *F16B 2/005* (2013.01); *F16B 2/22* (2013.01); *Y10T 24/1394* (2015.01); *Y10T 24/44752* (2015.01); *Y10T 24/44915* (2015.01)

(58) Field of Classification Search
CPC . A45F 5/021; A45F 3/005; F16B 2/22; Y10T 24/13; Y10T 24/44291; Y10T 24/44769; Y10T 24/44761; Y10T 24/44752; Y10T 24/4465; Y10T 24/44641; Y10T 24/44564; Y10T 24/44556; Y10T 24/44538; Y10T 24/4453
See application file for complete search history.

(56) References Cited

U.S. PATENT DOCUMENTS

| | | | | |
|---|---|---|---|---|
| 3,823,443 A | * | 7/1974 | Takabayashi | A44B 11/12 24/186 |
| 5,695,161 A | * | 12/1997 | Brozak, Jr. | A47F 5/0884 223/94 |
| 10,258,136 B2 | * | 4/2019 | Fiorello | A45F 5/021 |
| 2003/0229971 A1 | * | 12/2003 | Coyne | A45F 5/02 24/3.3 |
| 2007/0226958 A1 | * | 10/2007 | Clifton, Jr. | A45F 5/02 24/3.12 |
| 2017/0290410 A1 | * | 10/2017 | Evans | A45F 5/021 |

* cited by examiner

*Primary Examiner* — Robert Sandy
*Assistant Examiner* — Michael S Lee
(74) *Attorney, Agent, or Firm* — Lowe Graham Jones PLLC

(57) ABSTRACT

A retainer operable to hold a race number bib includes a front panel and a rear panel joined by an elbow and with a latch. One or more lateral projections is provided on the retainer to allow a user to open or close the retainer. Internal projections may provide gripping surfaces, and in some cases they extend through holes formed in one of the panels. A belt hook may be provided to secure a retainer to a belt.

20 Claims, 21 Drawing Sheets

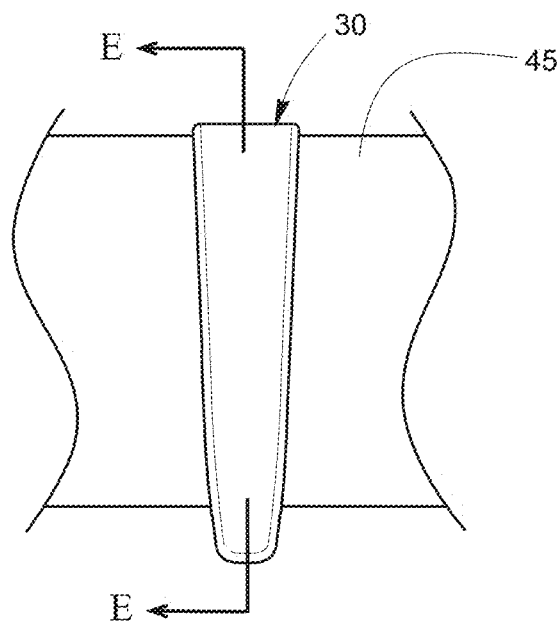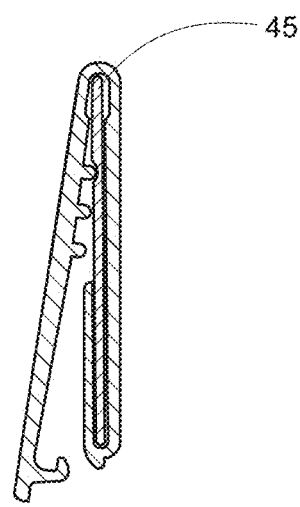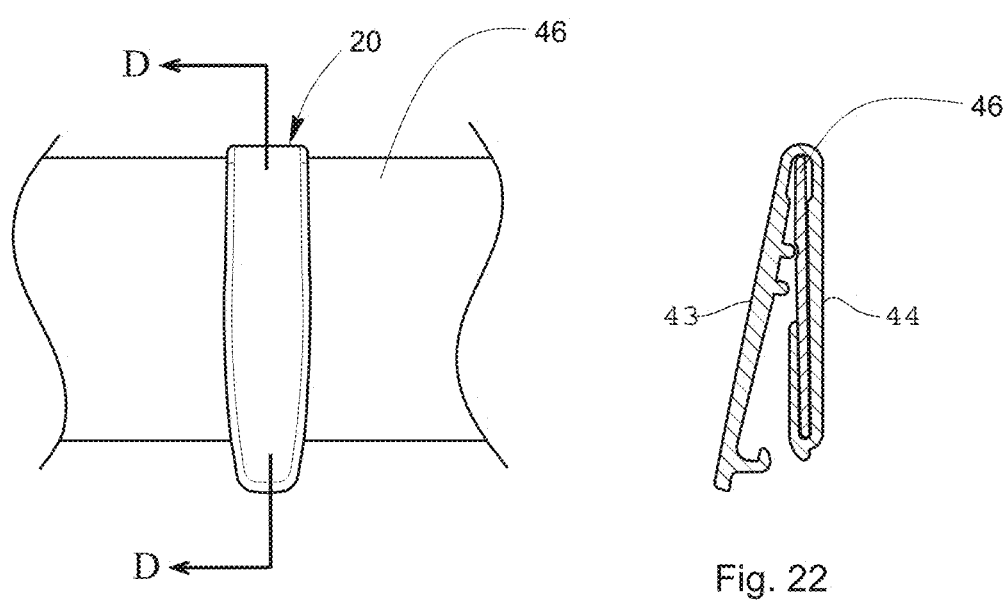
Fig. 23
Fig. 24
Fig. 21
Fig. 22

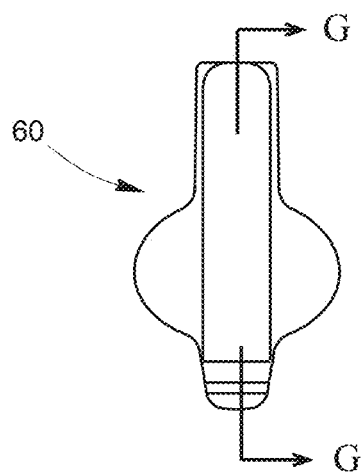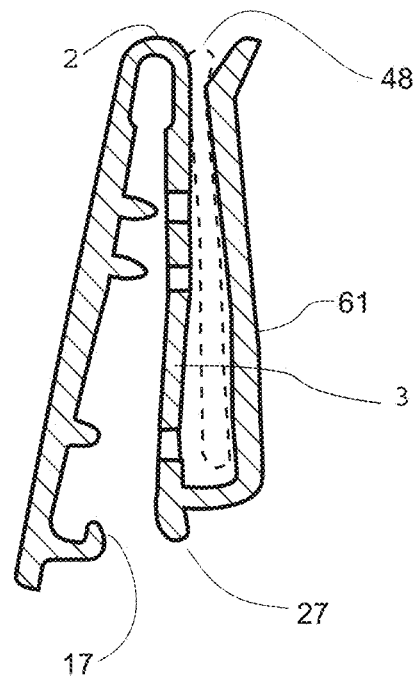
Fig. 33
Fig. 34
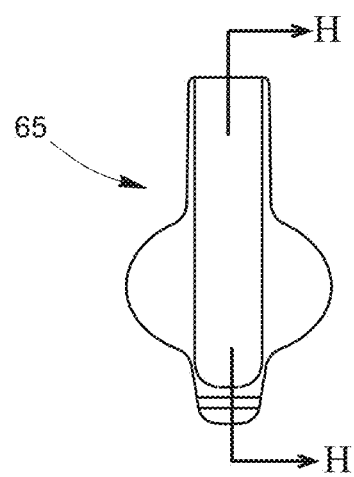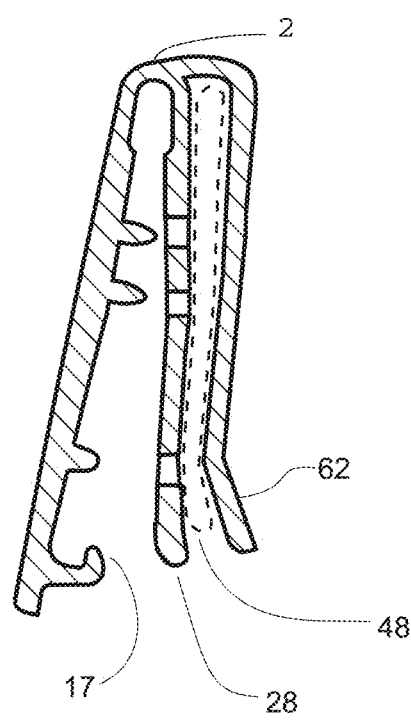
Fig. 35
Fig. 36

RETAINER

PRIORITY CLAIM

This application claims the benefit of U.S. provisional application No. 62/493,556 filed Jul. 8, 2016, the contents of which are incorporated by reference.

BACKGROUND OF THE INVENTION

During a triathlon or other race usually a competitor wears a race number bib such that the user can be identified. Usually these race bibs are made from a thin Tyvek or similar material so that the number bib is durable and is not damaged by sweat, rain or other moisture. Also during races, or in other conditions, a user may desire to carry an item such as a gel packet or other item for ready access. Current means for carrying the race number bib or other items in a manner that leaves them readily available for access by a user are undesirable.

SUMMARY OF THE INVENTION

A preferred retainer includes a front panel, the front panel being at least semi-rigid and having a top end and a bottom end, the front panel defining a width between the top end and the bottom end. A rear panel is also provided, the rear panel being at least semi-rigid and having a top end and a bottom end, the rear panel defining a width between the top end and the bottom end. A main elbow serves as a hinge to allow the front panel to move apart from the rear panel to an open position and to move toward the rear panel to a closed position.

A lateral extension is positioned on the rear panel, the lateral extension being configured as a surface on the rear panel between the top end and the bottom end of the rear panel which extends laterally beyond the width of the front panel.

A front panel tab is preferably positioned on the front panel, the front panel tab being configured as a surface on the front panel at the bottom end of the front panel and which extends beyond the width or the length of the rear panel. An intermediate panel having a top end and a bottom end is joined to the bottom end of the rear panel, the top end of the intermediate panel extending toward the main elbow.

A latch is preferably configured with a retainer hook extending from the front panel and a snap receiver extending from the lower elbow, the snap receiver being selectively receivable within the retainer hook to hold the retainer in the closed position, and removable from the retainer hook to enable the retainer to move to the open position.

In one version, the front panel further includes an interior surface facing toward the rear panel and an exterior surface facing away from the rear panel, the interior surface of the front panel having one or more protrusions extending toward the rear panel.

The rear panel may also include an interior surface facing toward the front panel and an exterior surface facing away from the front panel, the interior surface of the rear panel having one or more protrusions extending toward the front panel.

In some versions, the front panel tab is positioned adjacent the retainer hook.

In some preferred examples, the intermediate panel extends from the lower elbow to a position less than half way toward the main elbow. In other versions, the intermediate panel extends substantially to the main elbow.

The front panel may also comprises an interior surface facing toward the rear panel and an exterior surface facing away from the rear panel, the interior surface of the front panel having one or more front panel protrusions extending toward the rear panel, and wherein the rear panel further comprises an interior surface facing toward the front panel and an exterior surface facing away from the front panel, the interior surface of the rear panel having one or more rear panel protrusions extending toward the front panel, all of the front panel protrusions and all of the rear panel protrusions being positioned at a location above the intermediate panel.

In some examples, a plurality of front panel protrusions is formed on the front panel and a first through-hole formed in the intermediate panel, at least one of the plurality of front panel protrusions being positioned to extend into the first through-hole when the retainer is in the closed position.

In some versions, a second through-hole is formed in the rear panel, at least one of the plurality of front panel protrusions further being positioned to extend into the second through-hole when the retainer is in the closed position.

Optionally, a plurality of rear panel protrusions is formed on the rear panel and extends toward the front panel.

The intermediate panel may define a plane and in some versions at least one of the plurality of front panel protrusions extends through the plane when the retainer is in the open position.

In some embodiments, the intermediate panel is bowed toward the front panel between the top end of the intermediate panel and the bottom end of the intermediate panel. The top end of the intermediate panel may also be spaced apart from the rear panel in the open position, but configured so that the front panel urges the top end of the intermediate panel toward the rear panel in the closed position.

In preferred versions, the lateral extension extends laterally beyond the width of the front panel at a first side of the rear panel and at an opposing second side of the rear panel.

In some examples of the invention, a belt clip is attached to the rear panel and having a top end and a bottom end, and no intermediate panel is preferably used in such a version. A latch having a retainer hook extends from the front panel and a snap receiver extends from the lower elbow, the snap receiver being selectively receivable within the retainer hook to hold the retainer in the closed position, and removable from the retainer hook to enable the retainer to move to the open position.

In one preferred version, a lower elbow joins the bottom end of the belt clip to the bottom end of the rear panel, the lower elbow being operable as a hinge to allow the belt clip to selectively move apart from and toward the rear panel. An additional latch may also be provided with an additional retainer hook extending from the belt clip and an additional snap receiver extending from the main elbow, the additional snap receiver being selectively receivable within the additional retainer hook to hold the top end of the belt hook against the rear panel.

BRIEF DESCRIPTION OF THE DRAWINGS

Preferred and alternative examples of the present invention are described in detail below with reference to the following drawings.

FIG. 21 is a front view of an alternate preferred retainer attached to a belt or strap.

FIG. 22 is a section view as taken through section D-D of FIG. 21.

FIG. 23 is a front view of an alternate preferred retainer attached to a belt or strap.

FIG. 24 is a section view as taken through section E-E of FIG. 23.

FIG. 33 is a rear view of another alternate embodiment of a retainer.

FIG. 34 is a section view as taken through section G-G of FIG. 33.

FIG. 35 is a rear view of another alternate embodiment of a retainer.

FIG. 36 is a section view as taken through section H-H of FIG. 35.

DETAILED DESCRIPTION OF THE PREFERRED EMBODIMENT

Figure 1:
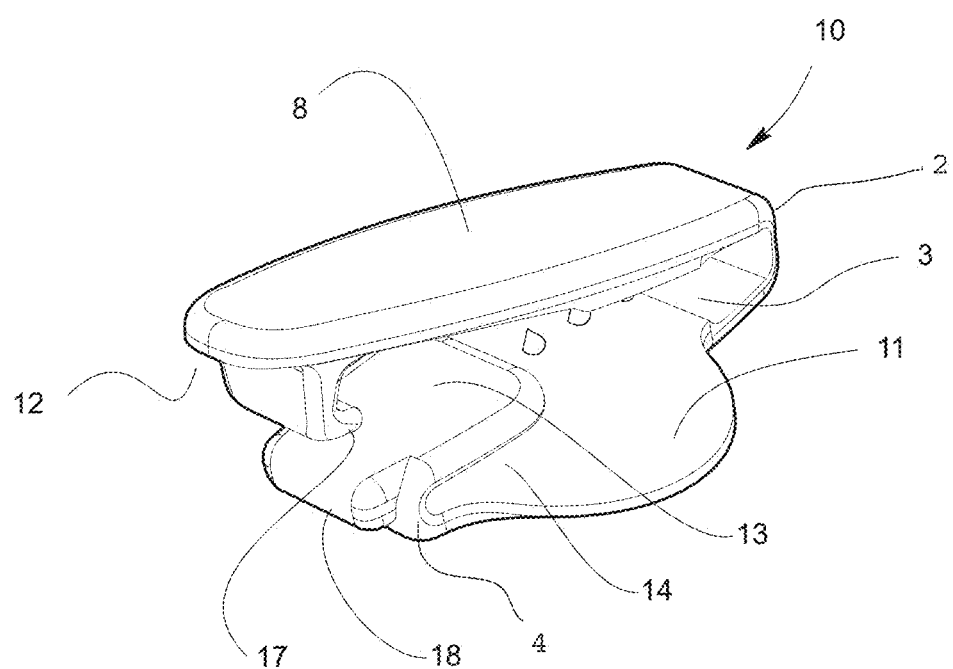
FIG. 1 is a front three-quarter perspective view of a preferred retainer.

FIG. 1 illustrates a front three-quarter perspective view of a preferred embodiment of a retainer, which is preferably formed as injection-molded delrin, glass-filled nylon or from other suitable materials. In general, the retainer includes a front beam or panel 8 of the retainer and an opposing base or rear panel 3 of the retainer. The front panel and rear panel cooperate to form an enclosed space, and in which the front panel and rear panel may be separated from one another to open or close the enclosed space. In each case, the front panel and rear panel are preferably formed to be substantially rigid, or at least semi-rigid, meaning that they are naturally stiff as with most plastic materials.

The front panel 8 is attached to the rear panel 3 at a main elbow 2 generally configured as a hairpin curve joining the front panel to the rear panel. The main elbow 2 includes sufficient flexibility to allow the main elbow to function as a partial hinge point for the front panel and rear panel, in which the two panels may pivot toward and away from another about the elbow.

In the illustrated example, a fastener is provided to allow the front panel 8 to selectively attach to and detach from the rear panel 3. In the illustrated example, the front panel includes a top end and a bottom end, with the elbow being positioned at the top end and the fastener being positioned at the bottom end. The fastener includes a retainer hook 17 at the bottom end. Most preferably, and as best seen in the side view of FIG. 3, the retainer hook is formed as a finger 17a extending from the front panel 8, perpendicularly from the illustrated example of a planar front panel and in a direction toward the rear panel 3. The exemplary finger terminates in an abutment 17b which projects in a direction generally toward the main elbow 2. The rear panel likewise has a top end and a bottom end, with the top end being at the main elbow 2. A snap receiver 18 is provided on the rear panel 3 at the bottom end of the rear panel and projecting in a direction away from the elbow. The snap receiver is received within a channel 17c formed by the retainer hook to hold the beam adjacent the base when the snap receiver is within the channel. Similarly, the snap receiver may be pried away from the retainer hook to release the back panel from the front panel, moving the retainer to an open position.

The retainer 10 includes a thumb leverage area configured as a lateral extension 11 which preferably extends laterally outwardly from the rear panel 3 beyond the footprint of the front panel 8 on either side of the front panel 8 between the top and the bottom. Most preferably, the lateral extension 11 is formed by having at least one location where the rear panel is wider than a corresponding width of the front panel immediately adjacent to the lateral extension. A beam tab, or lower tab 12, is provided on the beam, or front panel, at the bottom end of the front panel and projects axially away from the retainer hook in a direction away from the elbow, and thereby generally along an axis defined from the elbow toward the retainer hook. The lateral extension 11 and lower tab 12 are configured such that a user can use the surface area of the lateral extension and that of the lower tab by pressing a finger or thumb against the lateral extension 11 while applying pressure by a finger or thumb against the lower tab 12. This simultaneous application of force urges the front panel 8 and rear panel 3 apart from one another, dislodging the snap receiver 18 from the retainer hook 17 through the flexure of the materials, thereby unfastening the retainer and moving it from a closed to an open position. The retainer 10 is shown un-fastened in FIG. 1 (that is, in the open position), and shown fastened in FIG. 17 (that is, in the closed position).

A cantilever tab 13 preferably extends inward from the bottom end of the rear panel 3, in a direction toward the main elbow, so that the rear panel doubles back upon itself to form an interior channel or slot 14 between the cantilever tab 13 and the outer wall forming the base. The cantilever tab therefore preferably serves as an interior divider panel between the front panel and the rear panel. As described below, the cantilever tab or interior divider panel 13 and corresponding channel serve as a strap retention area.

Figure 2:
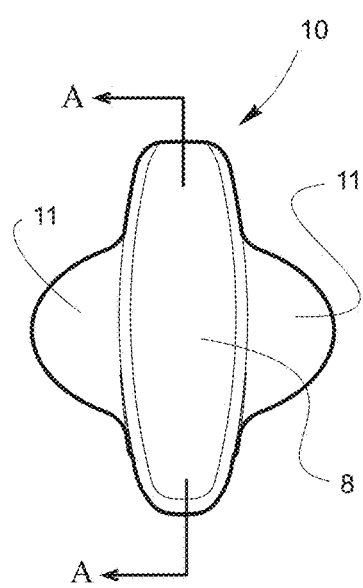
FIG. 2 is a front view of a preferred retainer.

FIG. 2 shows a front view of the preferred retainer 10, in which the thumb leverage areas configured as lateral extensions 11 can be seen extending beyond the perimeter of the front panel 8. In this example, there are two lateral extensions, one on either side of the rear panel between the top and the bottom. In other versions, there may be only a single lateral extension.

Figure 3:
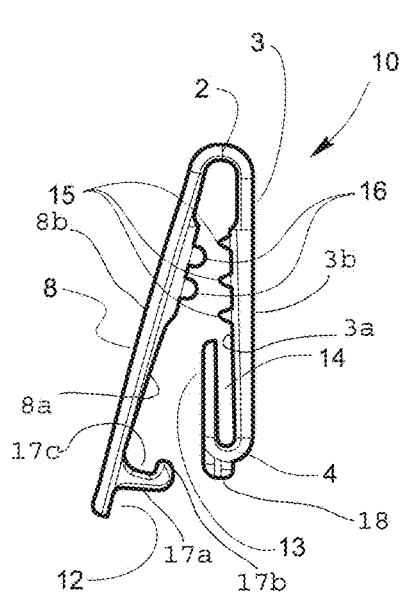
FIG. 3 is a side view of a preferred retainer, the opposite side preferably being a mirror image.

In FIG. 3, a side view of the retainer 10 is illustrated. The base or rear panel 3 preferably extends to a main elbow 2 at the top end of the rear panel, which is preferably connected to the beam or front panel 8 at the top end of the front panel. Further the base of the retainer 3 also preferably extends in the opposite direction from main elbow 2 to a lower elbow 4 at the bottom of the rear panel, which then transitions around the lower elbow 4 to join to the intermediate panel or cantilever tab 13. The space defined between the intermediate panel 13 and the rear panel 3 forms a channel or slot 14 which preferably serves as a strap retention area, dimensioned to allow a strap to be held in its space. Further, the rear panel 3 of the retainer 10 has an inner surface 3a and an outer surface 3b. Similarly, the front panel 8 further has an inner surface 8a and an outer surface 8b wherein the inner surface of the front panel 8 faces the inner surface of the rear panel 3. Both the inner surface of the front panel 8 and the inner surface of the rear panel 3 preferably have gripping/retaining features 16 and 15 respectively, such that the gripping/retaining features can facilitate holding a strap or straps as well as other items like a race number, cables, etc. Gripping features provided on inner surfaces of the front panel 8, intermediate panel 13, and rear panel 3 can take a variety of forms such as protrusions, protrusions that mate with holes in the opposing receiving areas, ribs, textured areas, spikes, second-shot elastomeric areas, inserted grip features, or others.

Figure 4:
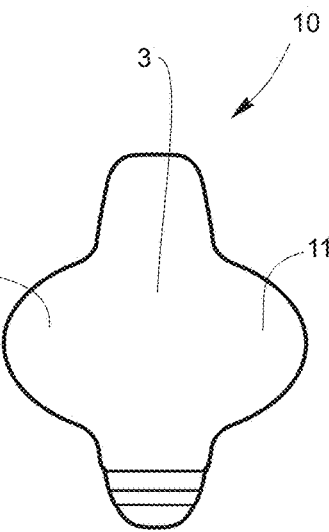
FIG. 4 is a back view of a preferred retainer.
Figure 5:
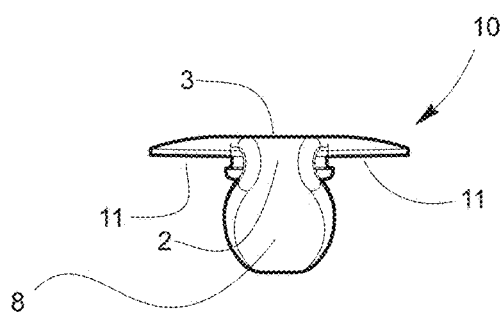
FIG. 5 is a top view of a preferred retainer.
Figure 7:
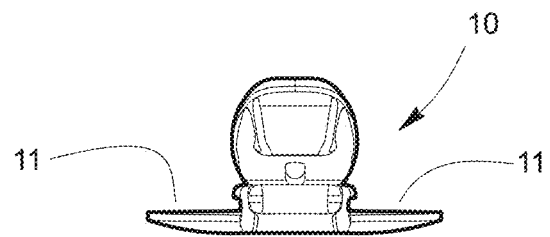
FIG. 7 is a bottom view of a preferred retainer.

FIG. 4 is a back view of an embodiment of a retainer 10 illustrating a rear panel 3 preferably having at least one lateral extension, but in the illustrated example two lateral extensions 11 serving as thumb/finger leverage areas. In the illustrated example, the lateral extensions extend from the rear panel 3 out beyond the width of the front panel 8 (not visible in FIG. 4) such that they can act as a leverage or grip feature allowing a user to open or un-fasten the retainer 10 by placing a finger or thumb on this lateral extension surface, pressing upward on the lower tab 12 while pressing downward on the lateral extension 11.

Figure 6:
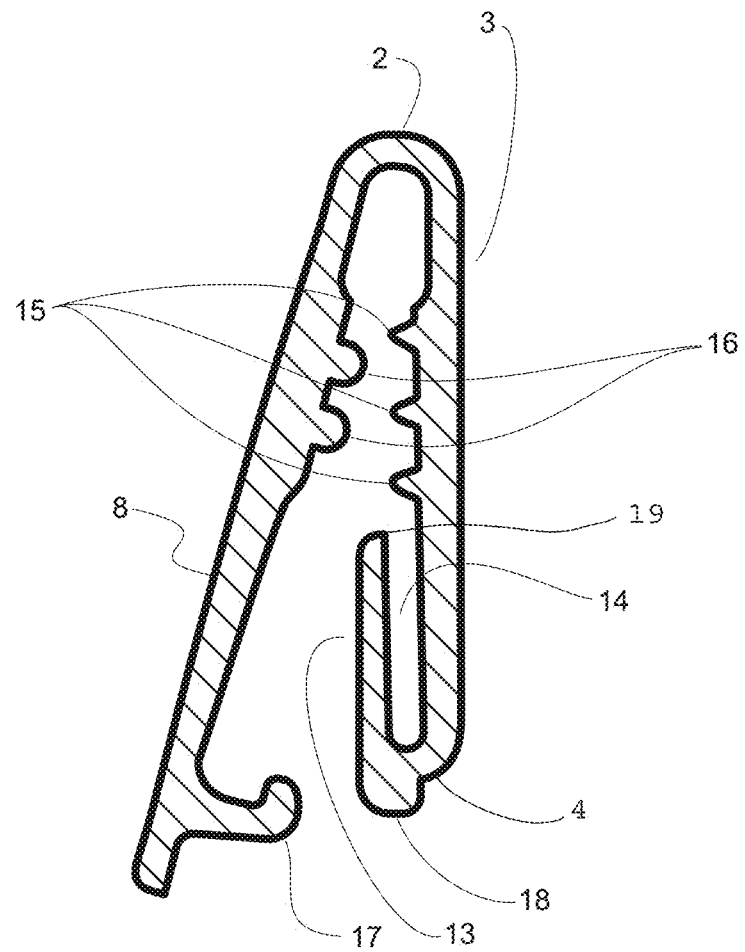
FIG. 6 is a section view of a preferred retainer, as taken through section A-A of FIG. 2.

FIG. 6 is a section view of the retainer as taken through section A-A of FIG. 2. Exemplary front grip details 16 and rear grip details 15 are illustrated in this version as protrusions (which may be pointed as spikes, or rounded as bumps) that extend from the inner surfaces of the front panel 8 and rear panel 3 toward the opposing panel. In most cases, and as illustrated, the grip details are spaced in alternating fashion between the front and rear panels as they proceed from the top to the bottom of the retainer, so that the grip details are intermeshed when the retainer is in the closed position. In this manner, the grip details provide an optimal gripping function while also allowing space for malleable materials that are placed between them to be held in their grip.

The cantilever tab or intermediate panel 13 preferably is thin and has some flexibility such that it can flex to accommodate different materials held within the strap retention area or inner channel 14, as well as potentially providing a gripping force for items held between the intermediate panel and the inner surface of the front panel 8. In the illustrated example, the rear panel 3 has a height from the lower elbow to the main elbow 2. Most preferably, the intermediate panel 13 also has a height from the lower elbow 4 to a top 19 of the intermediate panel 13. In the illustrated example, the intermediate panel 13 extends for a distance that is less than half the height of the rear panel, and more preferably about one third of the height of the rear panel. In addition, the grip features 15, 16 are preferably located above the top 19 of the intermediate panel 13.

Figure 62:
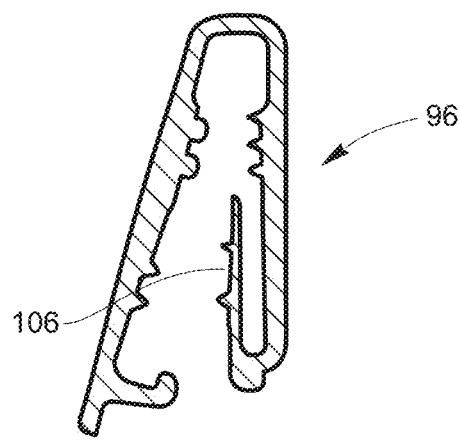
FIG. 62 is a section view of a retainer as taken through section N-N of FIG. 58, with the retainer in an open position and having alternate internal geometry.

Optional gripping elements can be provided on the intermediate panel 13 such that the intermediate panel can aid in gripping items when retainer is fastened to itself. FIG. 62 is an example of a cantilever tab 106 which has integrated gripping elements.

Figure 9:
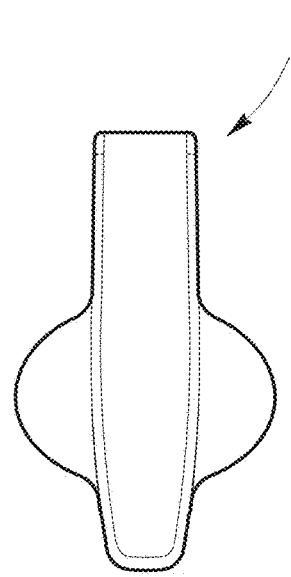
FIG. 9 shows a front view of the retainer of FIG. 8.
Figure 10:
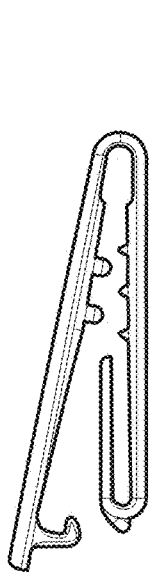
FIG. 10 shows a side view of the retainer of FIG. 8, the opposite side being a mirror image.
Figure 11:
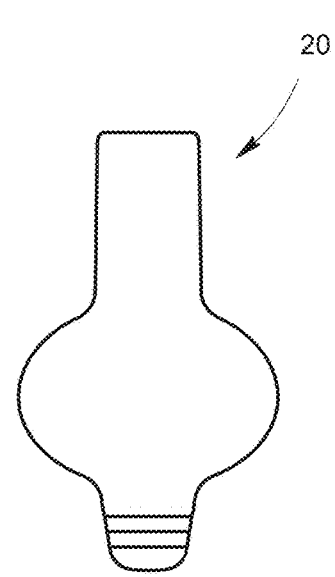
FIG. 11 shows a back view of the retainer of FIG. 8.
Figure 8:
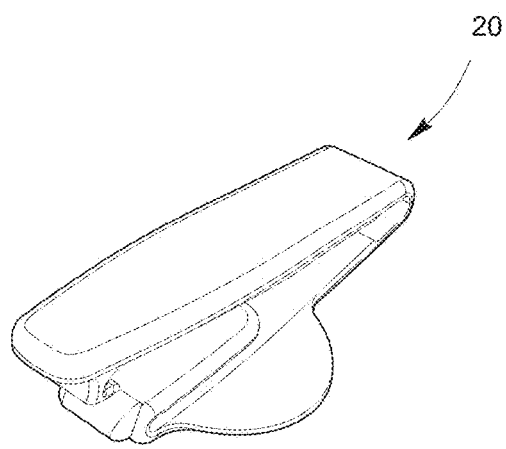
FIG. 8 is a front three-quarter perspective view of an alternate embodiment of a retainer, having a slightly more elongated form.

FIG. 8 is a front three-quarter perspective view of an alternate embodiment of a retainer 20, wherein the retainer 20 has a slightly more elongated form (that is, having a length from top to bottom that is even greater with respect to the width of the front panel) which could be preferable in some applications or for attachment to belts or straps that are relatively wide. The same version of a retainer is also illustrated in FIGS. 9-11.

Figures 13, 14:
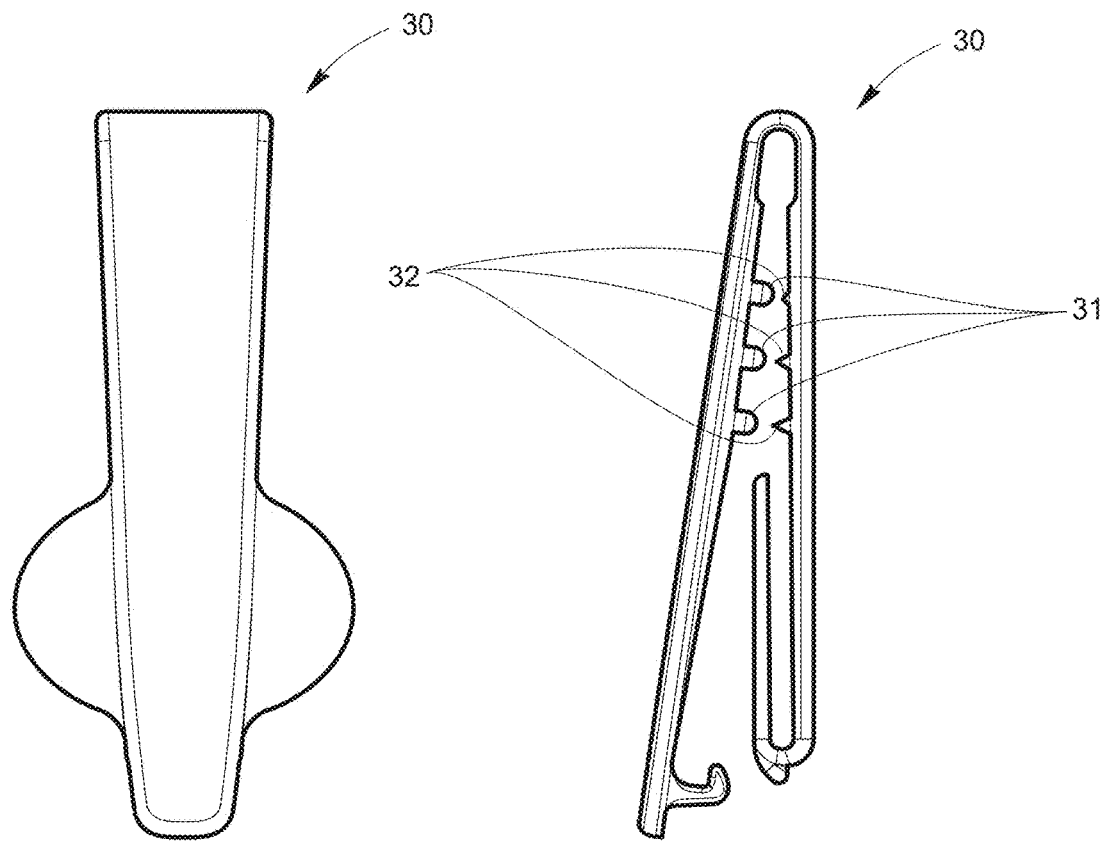
FIG. 13 shows a front view of the retainer of FIG. 12.
FIG. 14 shows a side view of the retainer of FIG. 12, the opposite side being a mirror image.
Figure 12:
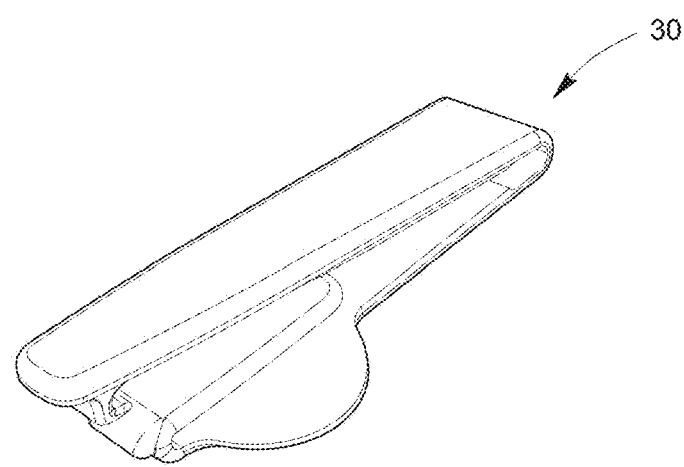
FIG. 12 is a front three-quarter perspective view of another alternate retainer, having an even more elongated form than the embodiment shown in FIG. 8.

FIG. 12 is a front three-quarter perspective view of another version of a retainer 30, in this case having an even more elongated form. It is further illustrated in FIGS. 13 and 14, showing interior grip details 31, 32 in the side view of FIG. 14.

Figure 15:
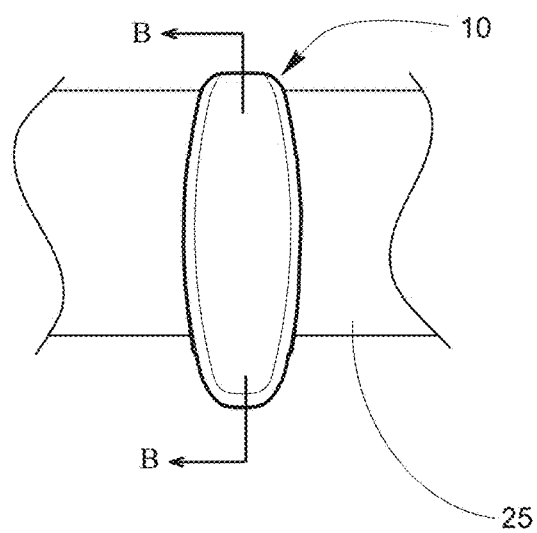
FIG. 15 is a front view of the retainer of FIG. 12.

FIG. 15 is a front view of preferred retainer 10 shown attached to a belt or strap 25, which is illustrated in partial cutaway form.

Figure 16:
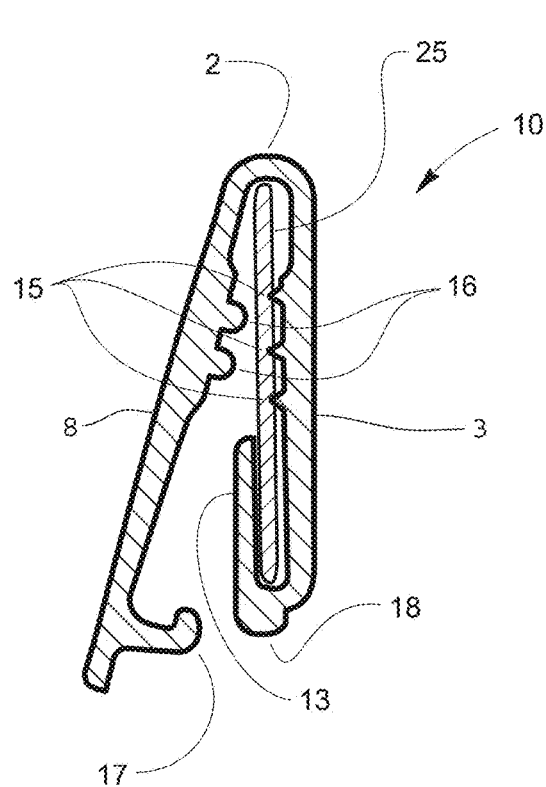
FIG. 16 is a section view of the retainer of FIG. 12, as taken through section B-B of FIG. 15 and illustrated in an open position.
Figure 17:
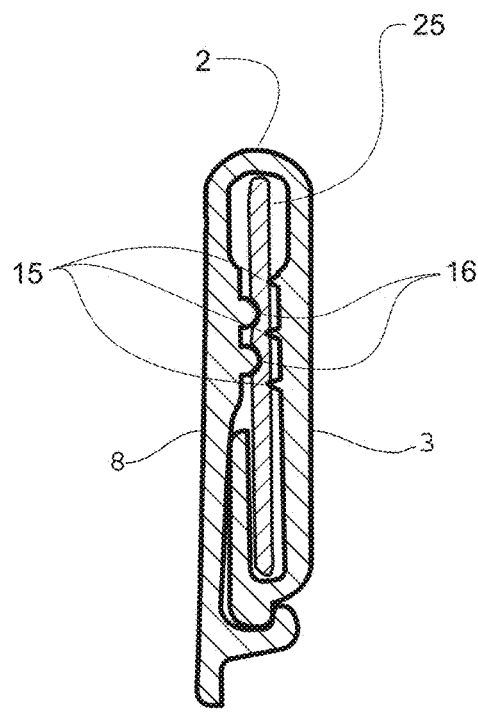
FIG. 17 is a section view of the retainer of FIG. 12, as taken through section B-B of FIG. 15, showing the retainer snapped into a closed position.

FIG. 16 is a section view through section B-B of FIG. 15. The strap or belt 25 is visible within the retainer 10 between the front panel and the rear panel, and with the retainer in the open position as illustrated the retainer can slide easily along the belt. As shown in FIG. 16, in the open position the front panel 8 and rear panel 3 are naturally biased slightly apart from one another, preferably forming an angle of about 20 to 25 degrees with one another, with the main elbow 2 at the apex and the sides of the angle being defined by the planar extensions of the front panel and rear panel. FIG. 17 illustrates the same sectional view as FIG. 16, but with the retainer snapped shut to a closed position. In this closed position, the belt 25 is now gripped by the front grip features 16 and rear grip features 15 (both formed as protrusions) such that the strapping is held firmly. In this illustrated example, in the closed position the front panel 8 and rear panel 3 are substantially parallel with one another, meaning that the angle about the main elbow is at five degrees or less. For different applications, it may be desirable to adjust the size, shape, material, or overall geometry and spacing of the grip features 15, 16 such that a strap can be held either more or less firmly, depending on the desired function. In some cases it may be desirable for the belt 25 to be able to slide freely within the retainer 10, and in such a case very few or no grip features would be provided.

Figure 18:
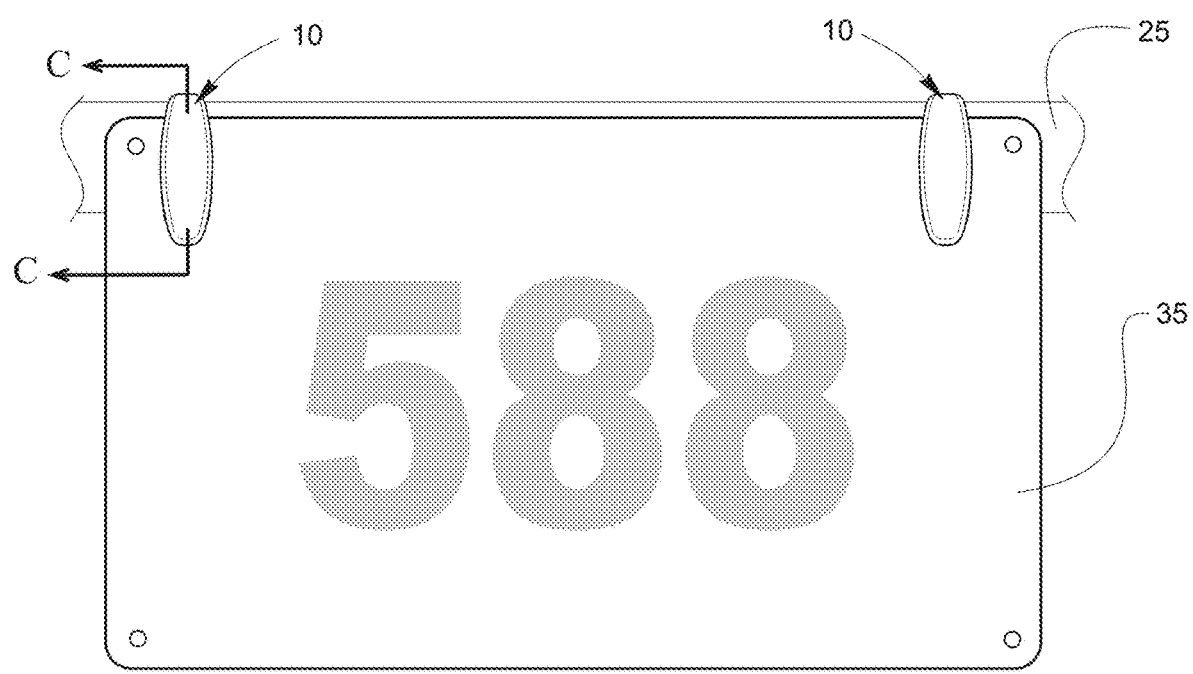
FIG. 18 is a front view showing two retainers fastened to belt (or strap) such that a race number is held in place on the belt.

In FIG. 18 a front view is shown in which two retainers 10 are fastened to a belt 25, and a race number bib 35 is held in place on the belt 25 by the retainers.

Figure 19:
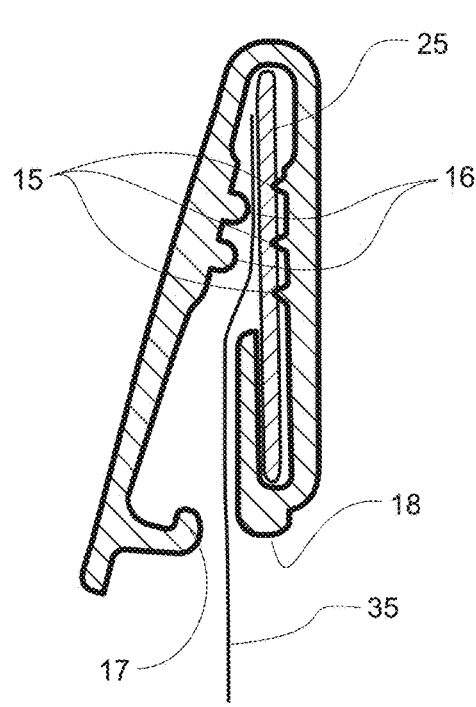
FIG. 19 is a section view as taken through section C-C of FIG. 18, showing the retainer in an open position.
Figure 20:
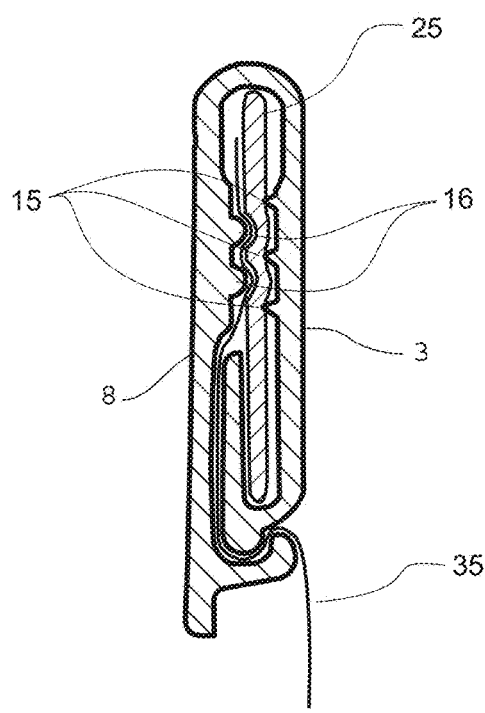
FIG. 20 is a section view as taken through section C-C of FIG. 18 showing the retainer snapped into a closed position.
Figures 51, 52:
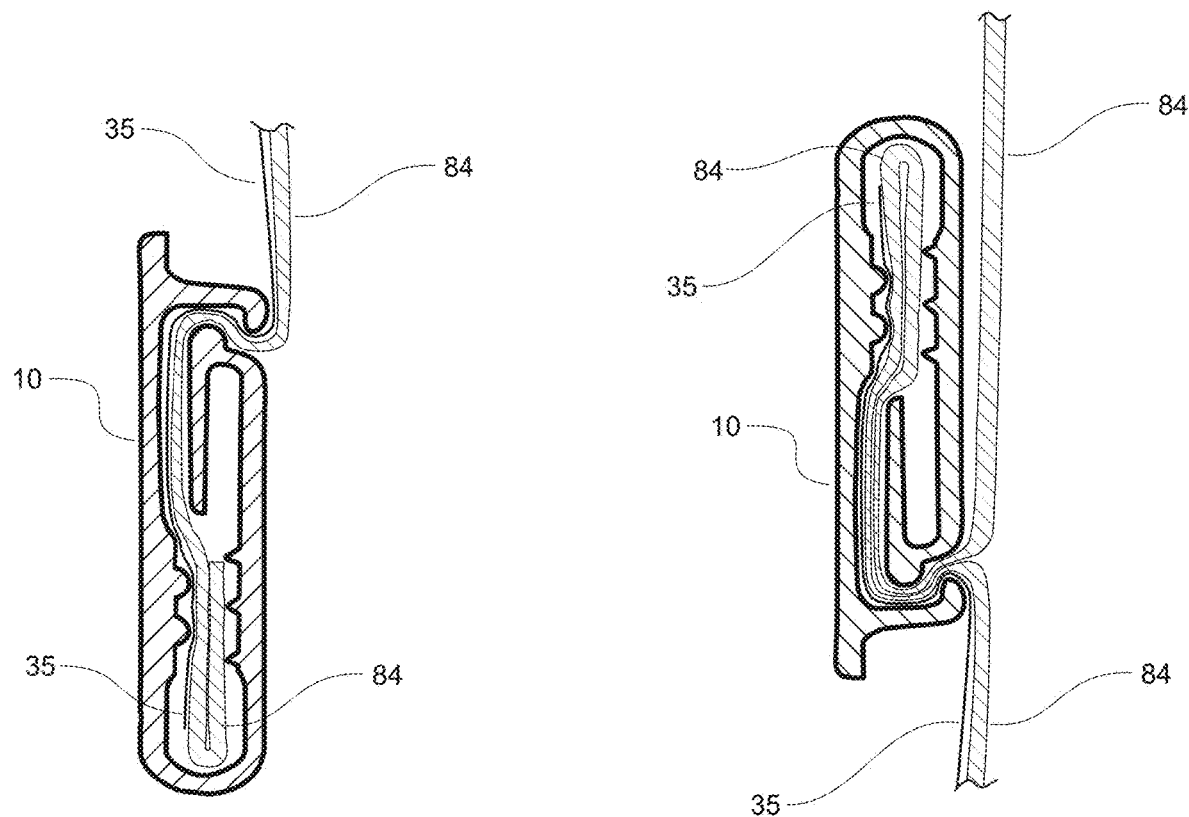
FIG. 51 is a section view as taken through section J-J of FIG. 49.
FIG. 52 is a section view as taken through section K-K of FIG. 50.

FIG. 19 is a section view through section C-C of FIG. 18, in which the retainer 10 is shown in an open position such that the belt 25 and race number bib 35 can be inserted by a user. The same section view through section C-C of FIG. 18 is also shown in FIG. 20, but in this case the retainer 10 is shown in a closed position so that the belt 25 and race number bib 35 are secured between the front panel 8 and rear panel 3. In this version, the retainer also includes interior grip features, including rear grip features 15 and front grip features 16. In the fastened position the retainer 10 can not only grip a strap 25 but also a race number bib or other item of sufficient size to be held in its jaws. In some cases it may be desirable to adjust the spacing and clearance between the retainer snap 17 and snap receiver 18 such that different thicknesses of material can be held in its jaws, for example in cases applied to a thin Tyvek race number 35 or thin shirt material 84 (as seen in FIG. 51-52), very little clearance is required, but in some cases it may be desirable to increase the spacing and clearance and/or adjust the malleability of the material used to make the retainer 10 so that thicker materials can be held in its jaws.

As shown in the example versions of FIGS. 21-22 it may be desirable to make a retainer that is longer for some applications such that wider strapping and or larger items can be held in its grip. In many cases the grip feature configuration preferably includes an interleaving front/back arrangement, but in the version of FIGS. 21 and 22 grip features are only provided on a front panel 44 and not on a back panel 43. FIG. 21 is a front view of the exemplary retainer 20 with a belt/strap 46 installed. FIG. 22 is a section view through section D-D of FIG. 21 wherein the retainer 20 is shown in an open position and a belt 46 is inserted. Alternatively, the grip features or protrusions may be formed on the back panel but not the front panel.

FIG. 23 is a front view of an alternate example of a retainer 30 with a wider belt 45 inserted, and therefore the retainer 30 is more elongated than other examples. FIG. 24 is a section view through section E-E of FIG. 23 wherein the retainer 30 is shown in the open position and the belt 45 is inserted.

Figure 25:
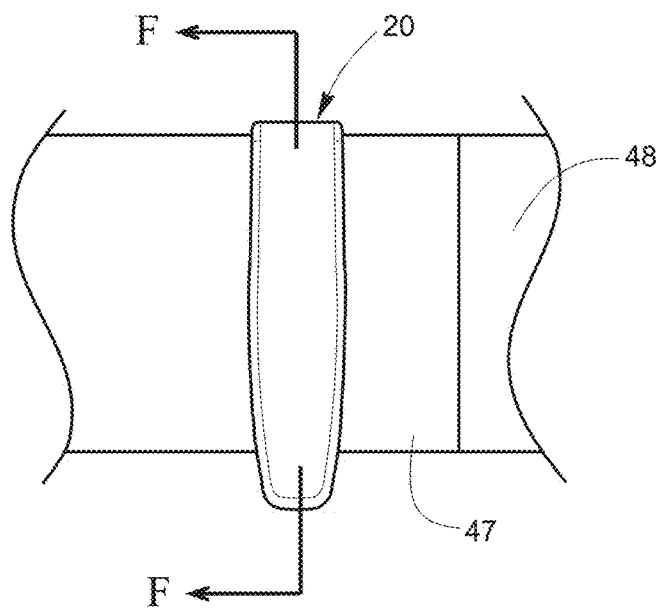
FIG. 25 is a front view of a preferred retainer attached to a belt or strap.
Figure 26:
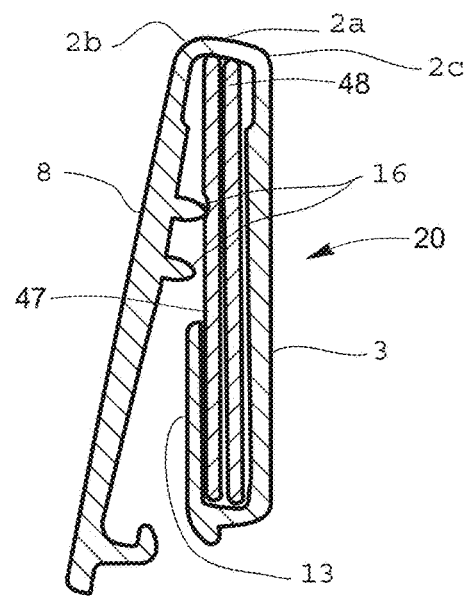
FIG. 26 is a section view of a preferred retainer, as taken through section F-F of FIG. 25, in which the retainer is shown in an open position and with a belt or strap inserted.

As shown in FIG. 25, in some cases it may be desirable for the preferable retainer to hold at least 2 thicknesses of belt, such as when an end portion 47 of a belt overlaps with another portion 48 of a belt. In FIG. 26, a section view through section F-F of FIG. 25, the retainer 20 is shown in the open position and two sections 47 and 48 of belt are inserted. In this version, the elbow is preferably formed with a relatively straight extension 2a between a pair of corners 2b, 2c, thereby providing greater separation between the front and rear panels. In other versions, the elbow may be formed differently while allowing for a larger interior space between panels.

The grip features for a retainer, particularly for use in such a case of increased thickness, may vary. In a first version, shown in FIG. 26 and taken through section F-F of FIG. 25, the retainer includes upper grip features 16 formed on the upper portion of the interior surface of the front panel 8, but no lower grip features on the front panel (in other words, all of the grip features are positioned above the top of the intermediate panel 13. Grip features are not shown on the rear panel 3 in the version of FIG. 26, but may be incorporated in other versions, such as shown in FIGS. 27 and 28.

Figure 27:
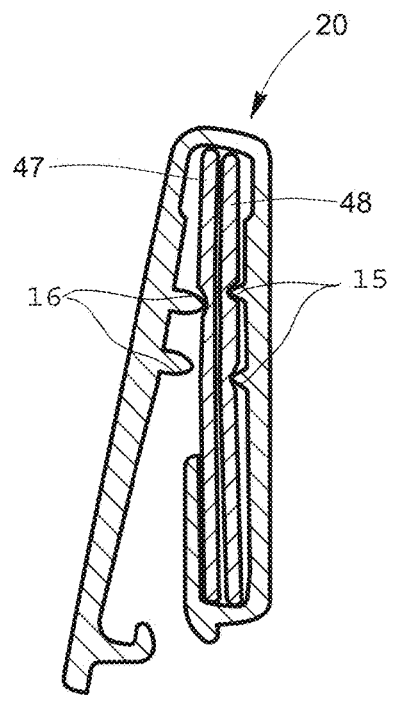
FIG. 27 is a section view of an alternate retainer, as taken through section F-F of FIG. 25, in which the retainer is shown in an open position and with a belt or strap inserted, and having alternate internal geometry.

It may be desirable to have both front and rear grip details and preferably interleaved as shown in FIG. 27 (which is a section view through section F-F of FIG. 25, as with FIG. 26, but in this case having a different interior grip detail geometry). The grip features as shown in this embodiment may be useful in situations in which a very strong grip is desired as opposing grip features 15, 16 are more closely lined up with one another.

Figure 28:
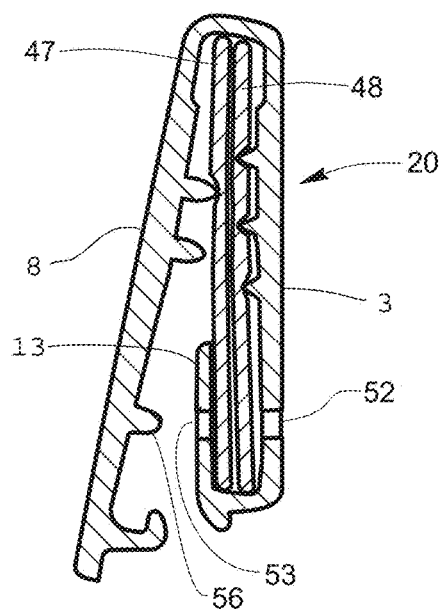
FIG. 28 is a section view of an alternate retainer, as taken through section F-F of FIG. 25, in which the retainer is shown in an open position and with a belt or strap inserted, and having alternate internal geometry.

FIG. 28 is also a section view through section F-F of FIG. 25 and showing yet another interior arrangement for grip features as compared to FIGS. 26 and 27. In this case, at least one lower grip feature 56 is formed as a projection on the front panel 8, and more specifically positioned so that it is below the top of the intermediate panel 13 and arranged to contact the intermediate panel when the retainer is in the closed position. Through-holes 52 and 53 are incorporated into the intermediate panel and rear panel to provide potential space for the protrusion 56 to further grip an item being held in the jaws of the retainer.

Figure 29A:
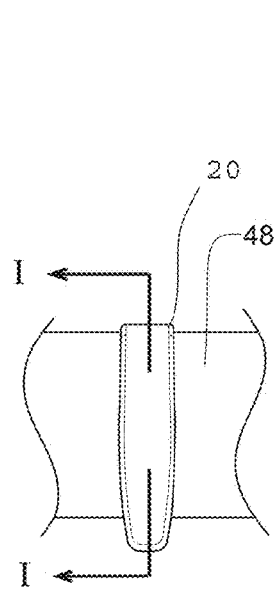
FIG. 29a is a front view of preferred retainer with a belt or strap.
Figure 29B:
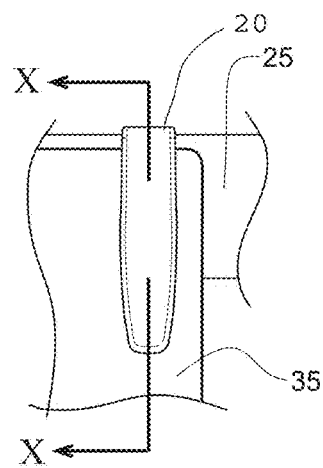
FIG. 29b is a front view of an alternate retainer with a belt or strap.
Figure 30:
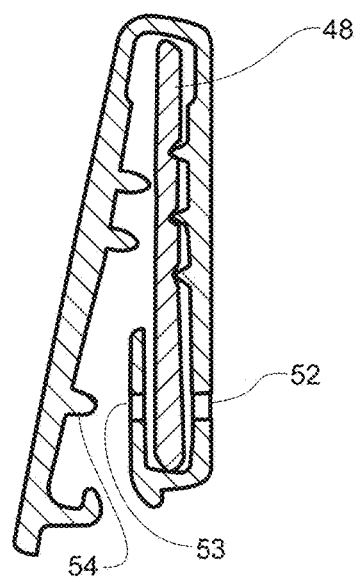
FIG. 30 is a section view as taken through section I-I of FIG. 29a, in which the retainer is shown in an open position and attached to a single strap or belt.

FIG. 29a is a front view of an exemplary retainer 20 with single belt section 48 inserted. FIG. 29b is a front view of the retainer 20 attached to a narrower belt 25 and also attached to a race number 35, clipped to the belt by the retainer. In FIG. 30 (a section view through section I-I of FIG. 29a) an alternate grip feature geometry is shown, in which the retainer and grip features are arranged to accommodate a variety of thicknesses of gripped items. The retainer of FIG. 30 is the same as that of FIG. 28, but in FIG. 28 two layers of belt are shown, and in FIG. 30 one layer is shown. The grip details include a protrusion 54 and through-holes 52 and 53 positioned to receive the protrusion 54.

Figure 31:
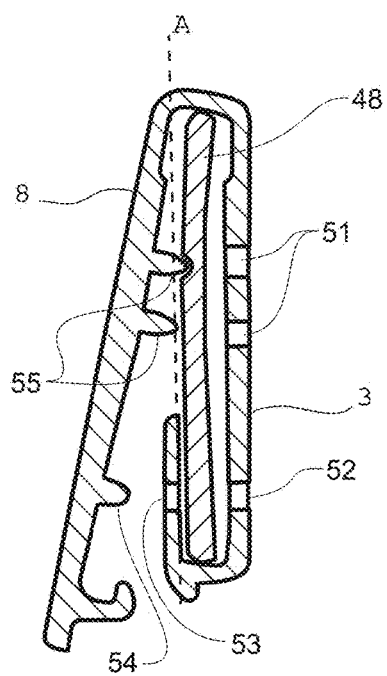
FIG. 31 is a section view as taken through section I-I of FIG. 29a, for an alternate embodiment of a retainer, in which the retainer is shown in an open position and a single strap or belt is attached, and having alternate internal geometry.

FIG. 31 is also a section view through section I-I of FIG. 29, illustrating another version of the possible grip features. In this example, the grip features 55 are formed as protrusions on the front panel 8, extending toward the rear panel 3, and in particular the protrusions are long enough to contact the belt when the retainer is in the open position. This is achieved, for example, by making one or more of the protrusions 55 so that they extend toward the rear panel at least beyond a plane defined by the intermediate panel, indicated as plane A in FIG. 31. Thus, the grip feature or features contact the belt 48 even in the open position and can slow or stop movement of the retainer on the belt 48 even in the open position. In this example, through-holes 52, 53 and 51 are provided for further clearance and gripping force of the protrusions 54, 55, thereby also allowing the protrusions to be longer and formed with sharper tips if desired.

Figure 32:
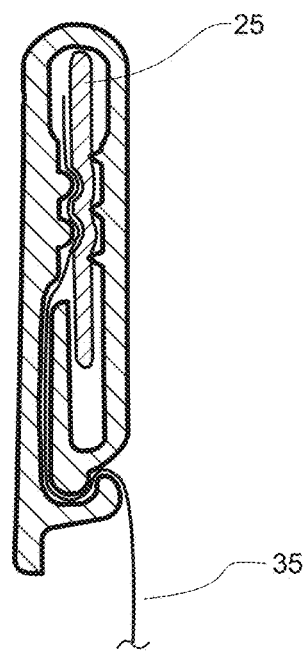
FIG. 32 is a section view through section X-X of FIG. 29b in which the retainer is shown in a closed position and with a belt and race number secured.

FIG. 32 is a section view through section X-X of FIG. 29b wherein the retainer is shown in a closed position, clamped about a belt section 25 and holding a race number bib 35. The incorporation of the grip features formed as projections, and the at least moderate flexibility of the panels, allows for a range of thicknesses of internal materials to be held in place.

FIG. 33 illustrates a rear view of another version of a retainer 60, and is further illustrated in a sectional view in FIG. 34, taken through section G-G of FIG. 33. In this version, an exterior belt clip is provided, preferably instead of the intermediate panel. In front view, the retainer 60 preferably looks the same as the front view of retainer 20 as shown in FIG. 9, but the side and rear views differ. In particular, as seen in the sectional view, an external belt clip 61 is attached to the rear panel 3, extending upward from the bottom end of the rear panel 3 so that the open end of the belt clip is adjacent the elbow 2. A belt 48 is shown held within the belt clip 61.

In this embodiment the belt clip 61 is designed such that it accepts a strap to be held in the belt clip. The area that a strap could be held is shown in dotted line and labeled 48 which is representative of a the cross-section of a strap that would be held in the belt clip. Retainer snap 17 and receiver area 27 are labeled wherein retainer 60 could be fastened to itself by clipping retainer snap 17 to receiver area 27.

FIG. 35 is a rear view of another embodiment of a retainer 65. A front view of retainer 65 would preferably look like the front view of retainer 20 shown in FIG. 9.

FIG. 36 is a section view through section H-H of FIG. 35. In this embodiment a belt clip 62 is designed such that it accepts a strap to be held in the belt clip area, and more particularly in this version the belt clip is attached at the elbow 2 and has an open end at the bottom of the retainer. The belt clip feature 61 in FIG. 34, as compared to the belt clip feature 62 in FIG. 36, indicates that in some cases it may be desirable for the belt clip feature to have the opening for the belt to be configured on the same side as the opening of the jaws of the retainer as in FIG. 36 or on the opposite side as in FIG. 34. The area that a strap could be held is shown in dotted line and labeled 48 which is representative of a the cross-section of a strap that would be held in the belt clip. In each case, preferably a retainer hook 17 and snap receiver 28 are provided as a fastener.

Figure 37:
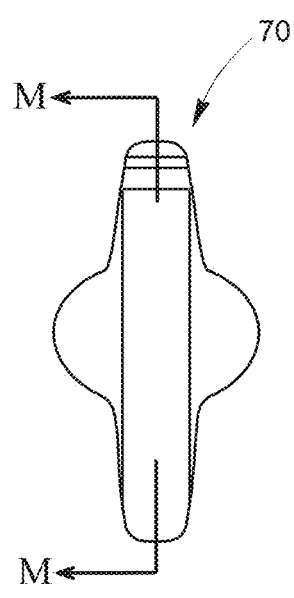
FIG. 37 is a front view of another preferred embodiment of a retainer.
Figure 38:
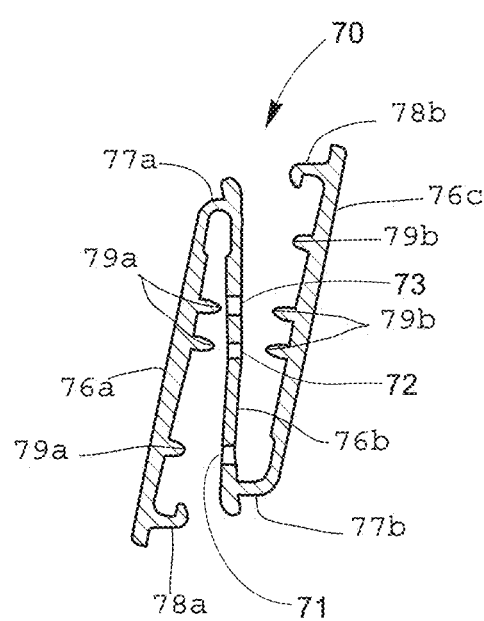
FIG. 38 is a section view as taken through section M-M of FIG. 37.
Figure 39:
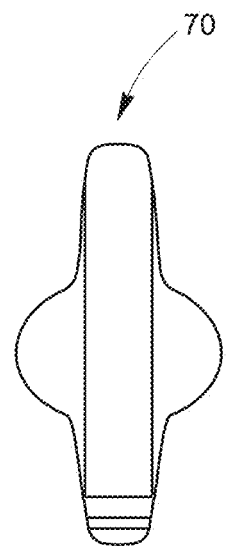
FIG. 39 is a back view of the retainer of FIG. 37.

FIG. 37 is a front view of another embodiment of a retainer 70, shown in front view in FIG. 39. FIG. 38 is a section view through section M-M of FIG. 37. In this version, the retainer includes a front panel 76a, a rear panel 76b, and a belt clip 76c. A main elbow 77a joins the front panel and rear panel as with versions described above, while a lower elbow 77b joins he belt clip to the rear panel. A first fastener 78a (configured as a retainer hook on the front panel and snap extension on the rear panel, in the manner as discussed above) joins the front panel to the rear panel, while a second fastener 78b (configured as a retainer hook configured on the open end of the belt hook, and a snap extension on the main elbow) selectively joins the belt clip to the rear panel in the manner as discussed above. A number of protrusions 79a or gripping elements are provided on the front panel extending toward the rear panel, and in this case a number of protrusions 79b are also provided on the belt clip and extending toward the rear panel. Through holes 71, 72 and 73 are provided on the rear panel and positioned to accommodate the protrusions from either side.

Figure 40:
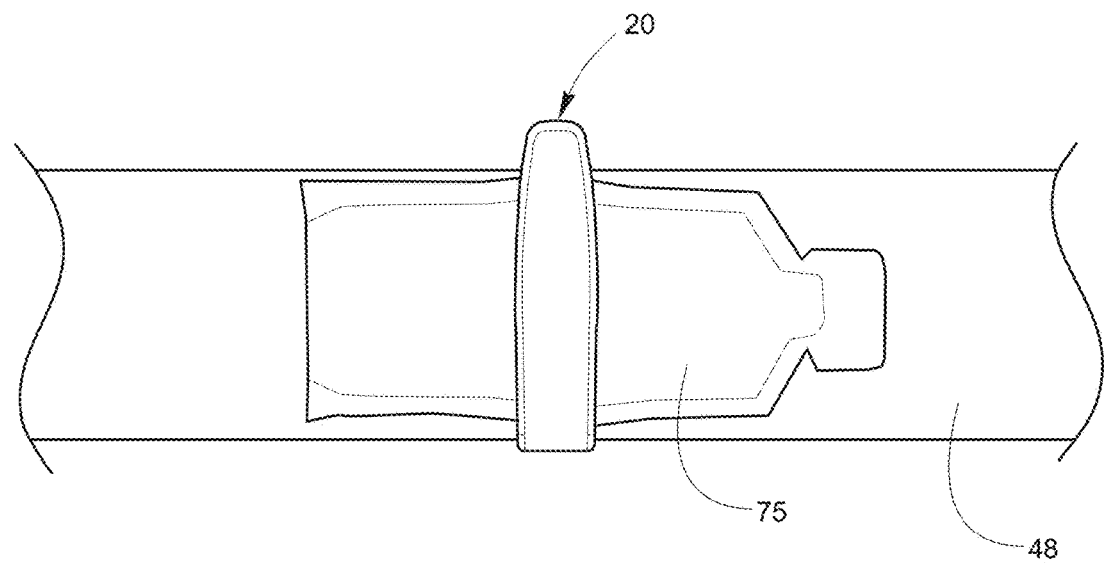
FIG. 40 is a front view of a preferred retainer shown attached to a belt and securing a packet of gel.
Figure 41:
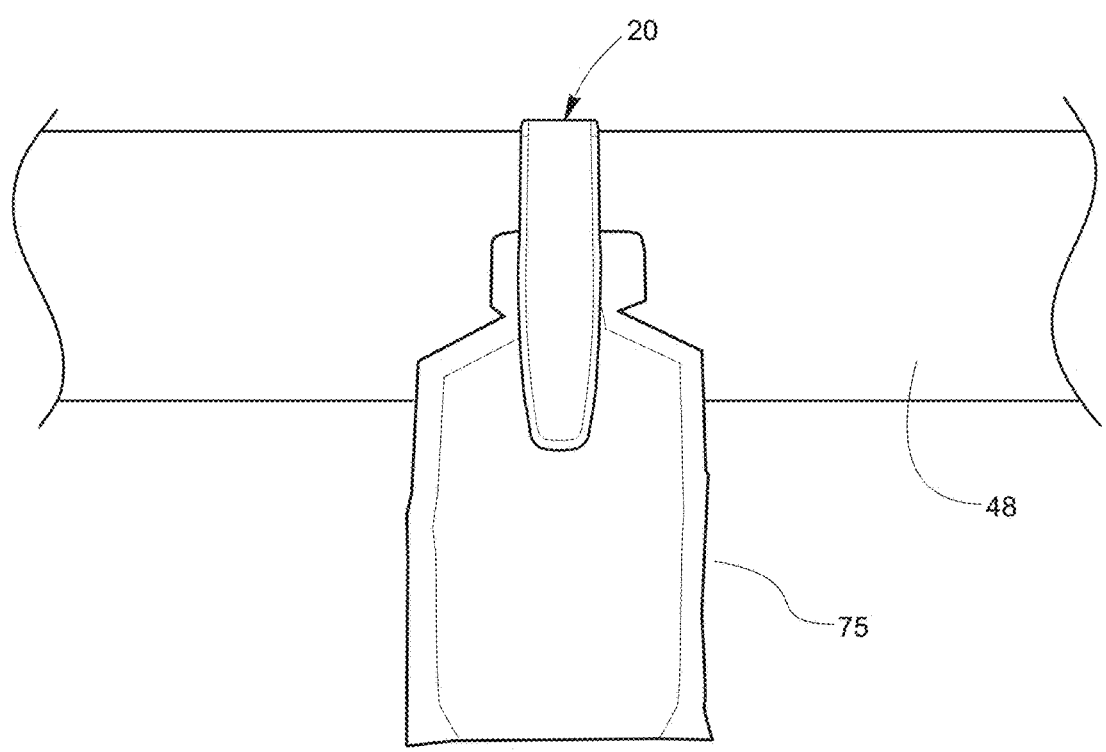
FIG. 41 is a front view a preferred retainer shown attached to a belt and securing a packet of gel.

FIG. 40 is a front view of a retainer 20 installed on a belt 48 and also holding a packet of energy gel or the like 75 by fastening the retainer 20 to itself while securing the gel packet 75 in place between panels of the retainer. FIG. 41 is a front view of a retainer 20 holding a packet of gel 75 (or other item) in a different orientation. It may be desirable for a user to be able to fasten an item to a belt, fabric edge or other location in a variety of ways depending on the circumstances. As also shown in FIG. 40, it may be desirable for the retainer to be configured in an open-upward manner or, as shown in FIG. 41, in an open-downward manner.

Figure 42:
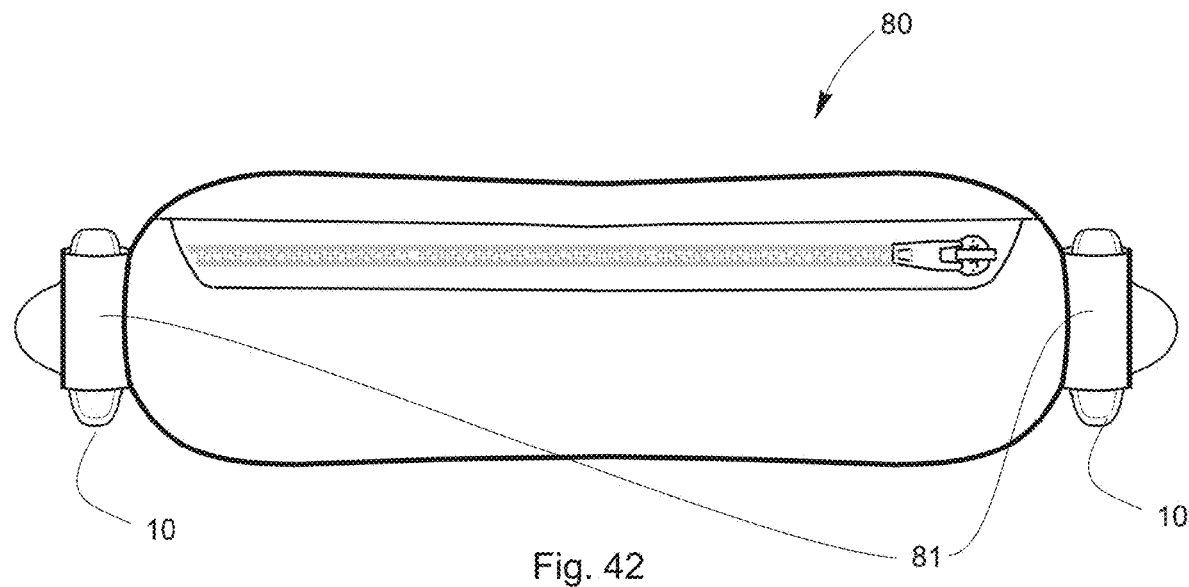
FIG. 42 is a front view of a pouch with retainers installed in loops positioned on either end of the pouch.

FIG. 42 is a front view of a pouch 80 with retainers 10 installed in loops 81 or the like on either end of the pouch 80, allowing the pouch 80 to be attached to a strap (not shown) and held retained on the strap with the retainers 10. In some cases it may be desirable to fasten a pouch to a strap, a waistband, fabric edge or the like such that the pouch can be moved to different positions and then retained in place by retainers 10. If a pouch is configured as shown with loops 81 at each end, allowing the beam or front panel to pass into and through the loops, the pouch 80 can be attached to and retained on the belt.

Figure 43:
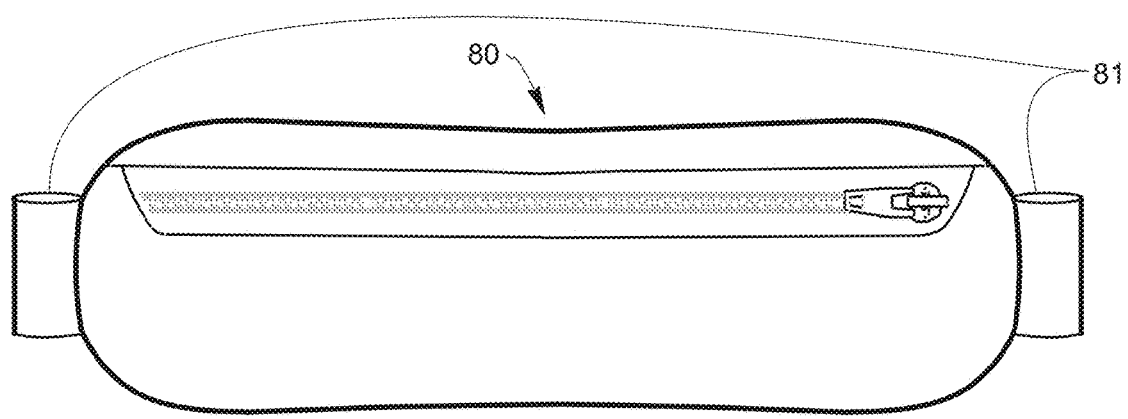
FIG. 43 is a front view of a preferred pouch having loops but without retainers installed as shown in FIG. 42.

FIG. 43 is a front view of an exemplary pouch 80, without retainers illustrated. Loops 81 are provided as described above with reference to FIG. 42.

Figure 44:
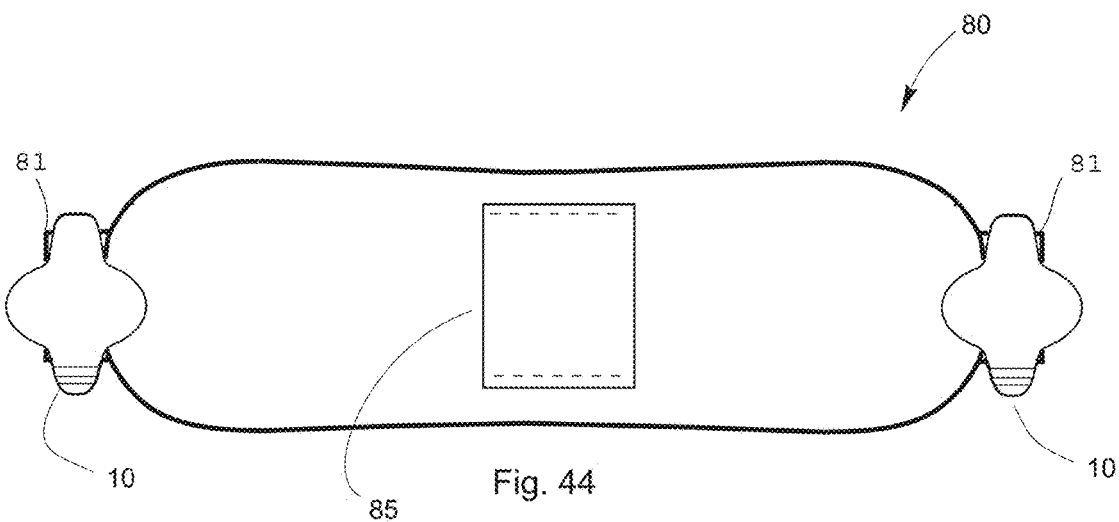
FIG. 44 is a back view of the preferred pouch and retainers of FIG. 42.

FIG. 44 is a back view of a pouch 80 wherein retainers 10 are installed in loops 81. Central belt loop 85 is also provided in the illustrated example, allowing a strap to pass through the loop 85 and then be retained in place on belt with retainers 10 at either end of the pouch. In this way, the loop 85 not only can function as security to make sure the pouch cannot come off the belt but also as a central support for fixing the pouch to the belt centrally.

Figure 45:
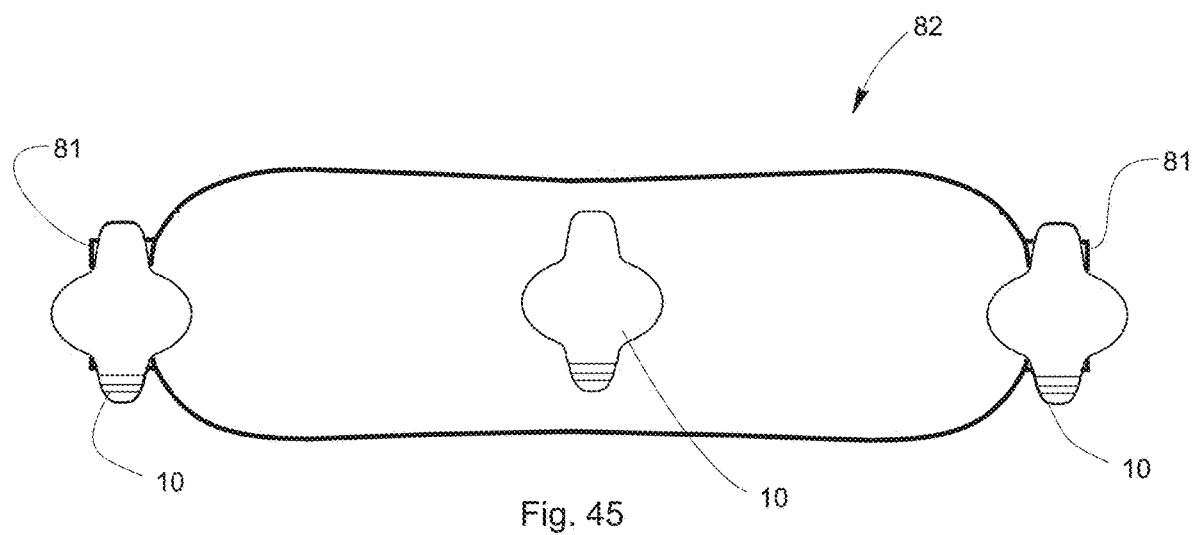
FIG. 45 is a back view of an alternate pouch, shown with three retainers attached.
Figure 46:
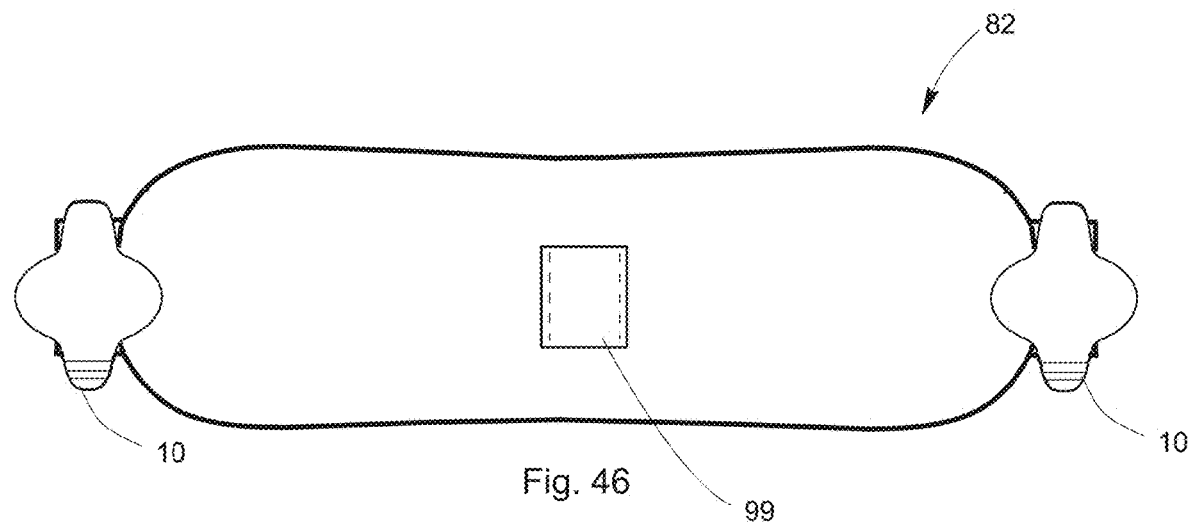
FIG. 46 is a back view of a pouch and attached retainers.

FIG. 45 is a back view of an alternate pouch 82 wherein a front view would preferably look like the pouch 80 in FIG. 42. In this version, three retainers 10 are installed, two in peripheral side loops 81 and one in a central loop 99 which is not visible in FIG. 45 but is shown in FIG. 46. In this version, three retainers are used to attach the pouch to a belt. FIG. 46 is a back view of the pouch 82, indicating a central loop 99.

Figure 47:
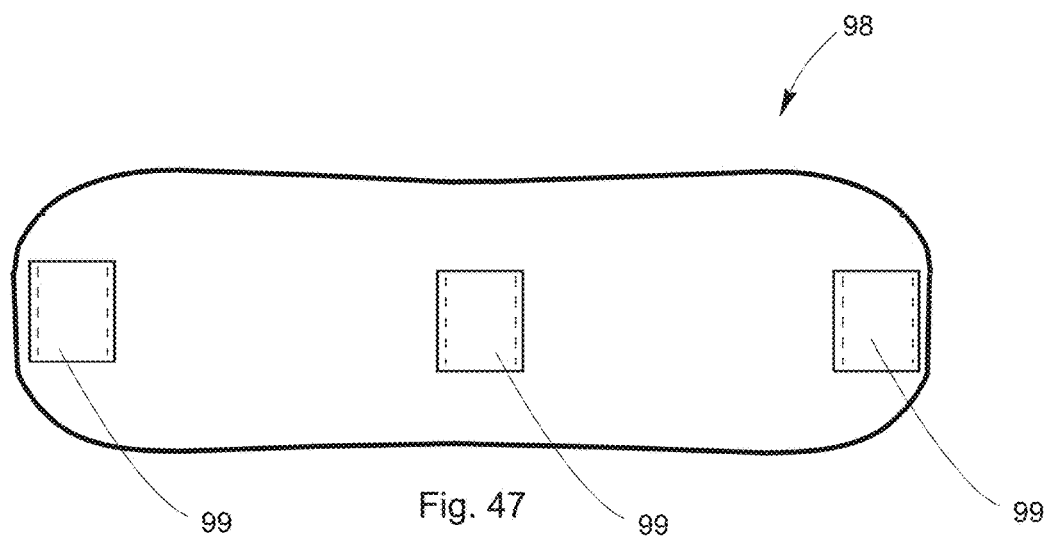
FIG. 47 shows a back view of a pouch with loops for attachment of retainers.

FIG. 47 shows a back view of another version of a pouch 98 having three loops 99 to serve as installation locations for retainers of the type described above. The pouch may be fabricated from a variety of materials such as nylon, polyester, or other synthetic or natural materials, and may incorporate an integrated zipper as shown, or have pockets or other features. Webbing or stretch webbing would preferably be used for loop material.

Figure 48:
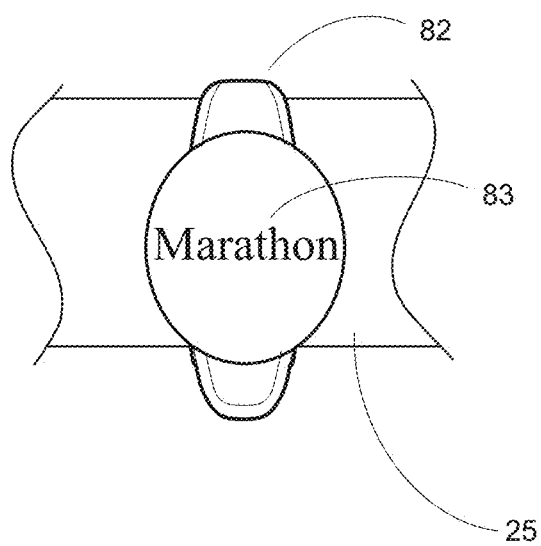
FIG. 48 shows a front view of another retainer embodiment shown attached to a belt and shown bearing a logo.

FIG. 48 shows a front view of another embodiment of a retainer 82 installed on a belt 25 and incorporating a logo or other indicia 83 which is applied, screened, stickered or integrally molded on the outer surface of the front panel. An optional loop may also be provided with a logoed emblem (much like a ring worn on a person's finger) such that it could be fed onto the front panel 8 and held in place, thereby allowing the logo to be visible externally to the retainer but also to be removed or exchanged.

Figure 49:
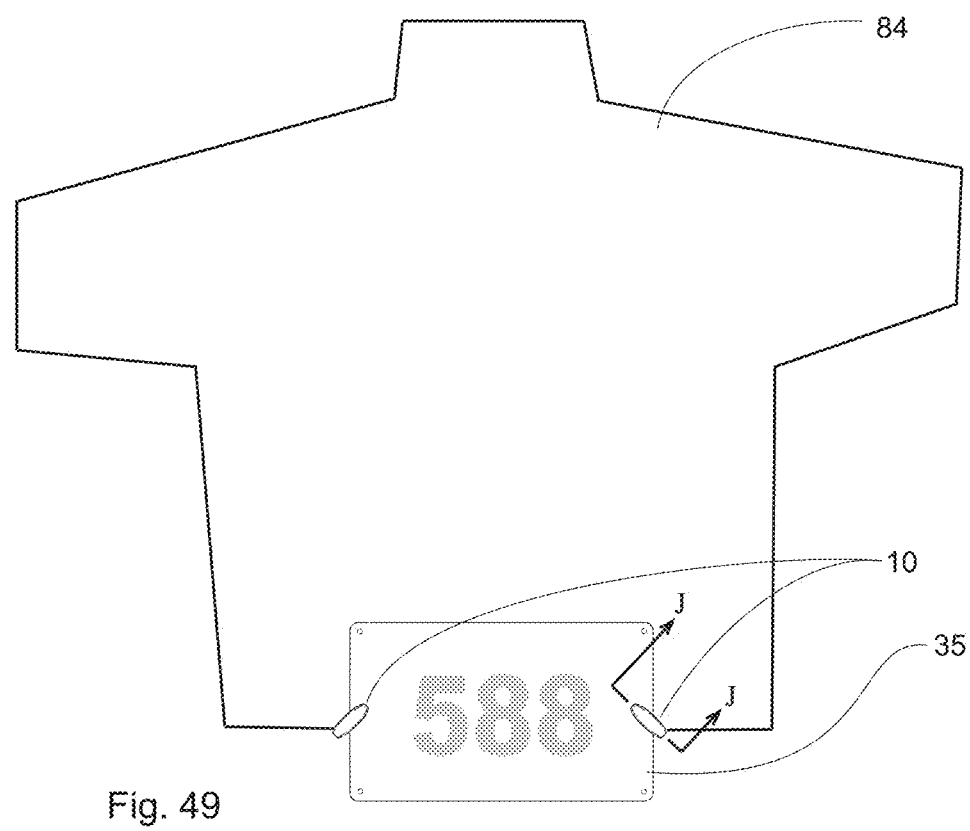
FIG. 49 shows a front view of an example shirt with a race number attached using two retainers.

FIG. 49 shows a front view of an example shirt 84 wherein a race number bib 35 is attached to the shirt 84 using two retainers 10. FIG. 51 illustrates a sectional view through section J-J, showing how the retainer 10 can be attached to a shirt 84 including a fabric edge of the shirt, and also to a race number bib 35, sandwiching both between front and rear panels of the retainer.

Figure 50:
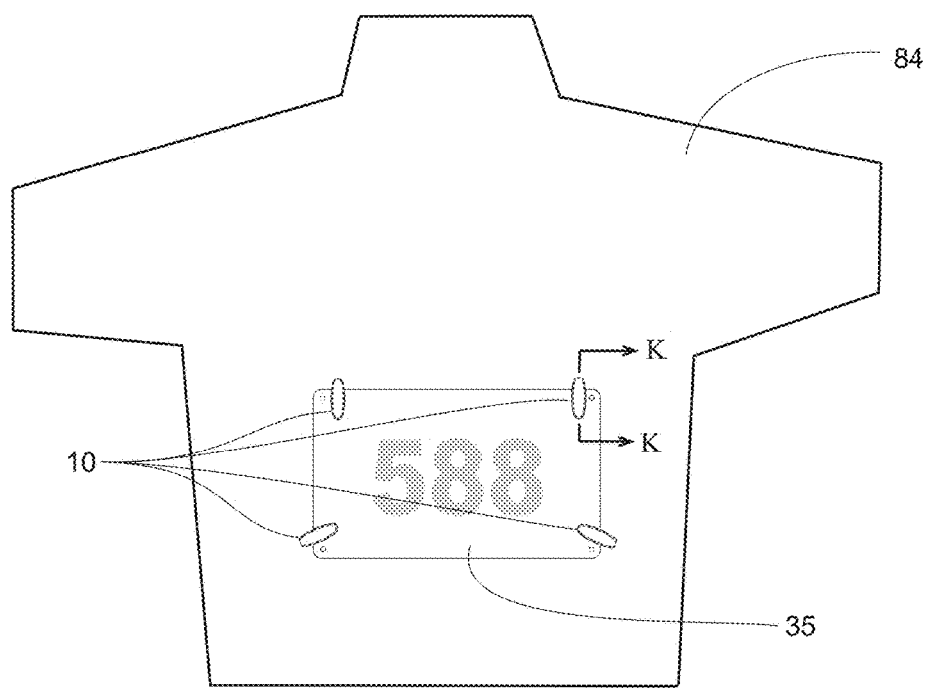
FIG. 50 shows a front view of an example shirt with a race number attached to the shirt using four retainers.

FIG. 50 shows a front view of the example shirt 84 with a race number bib 35 attached to the shirt 84 using four retainers 10. FIG. 52 is a sectional view taken through section K-K of FIG. 50, again illustrating a race number bib 35 and section of a shirt 84 sandwiched within. As illustrated, an edge of the shirt can be formed by folding over a portion of the fabric forming the shirt onto itself.

Figure 53:
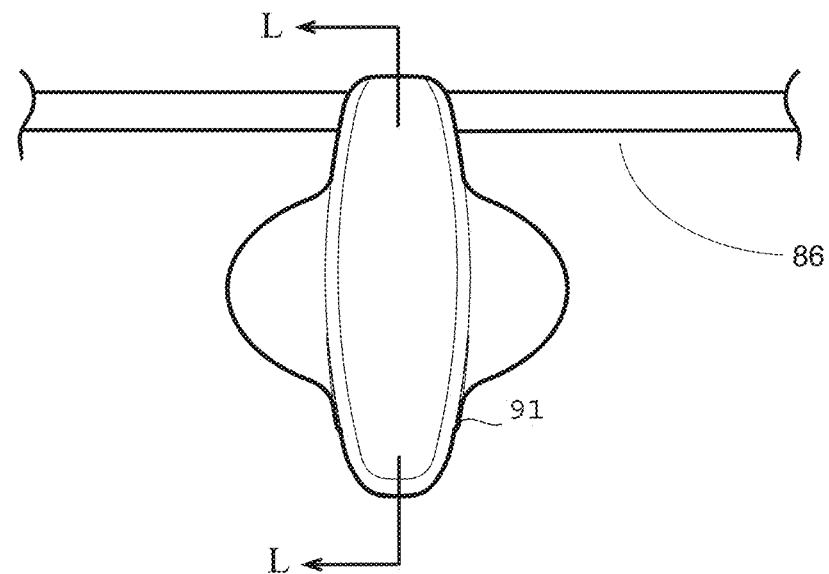
FIG. 53 is a front view of a retainer embodiment, shown having a wire, string, cord, or cable attached.

FIG. 53 is an example front view of a retainer 91 attached to a cord 86, rather than to a belt or a shirt. FIGS. 54-57 illustrate the sectional views taken through section L-L of FIG. 53, showing various alternate versions.

Figures 54, 55:
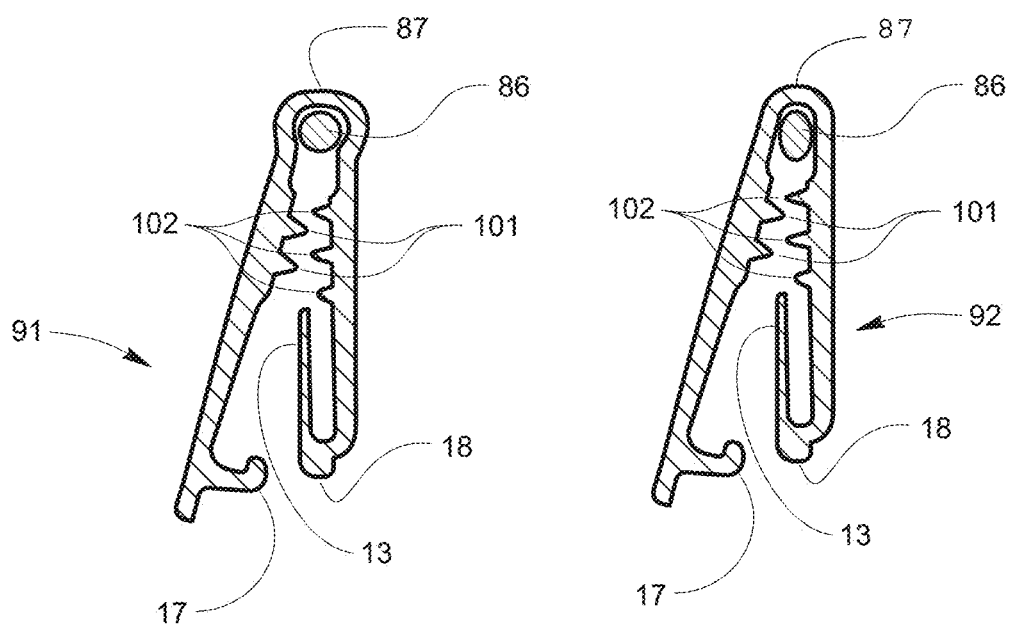
FIG. 54 is a section view of a retainer as taken through section L-L of FIG. 53, with the retainer in an open position.
FIG. 55 is a section view of a retainer as taken through section L-L of FIG. 53, with the retainer in an open position.

In FIG. 54, a section view of retainer 91 through section L-L of FIG. 53, the cord 86 is shown held retained in the top elbow 87. In some versions, the elbow may be formed with an interior cross section intended to accommodate a cord, and thereby having a generally circular channel in cross section as shown in FIG. 54. Protrusions or gripping details 101, 102 are provided in a manner as described above with other embodiments.

In FIG. 55, a sectional view of another embodiment of the retainer 92 through section L-L of FIG. 53, the elbow is formed with a different shape (that is, without a bulbous or circular cross section) which serves to flatten the cord when retained.

Figure 56:
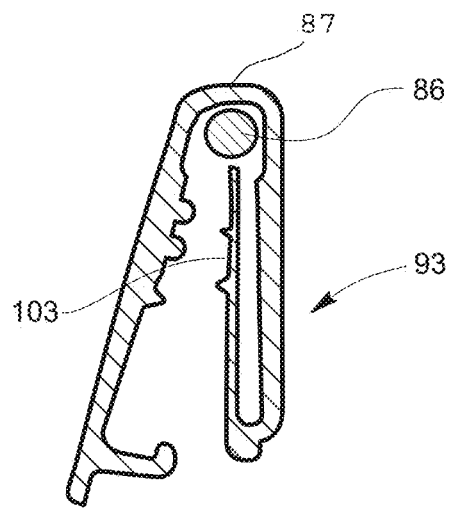
FIG. 56 is a section view of a retainer as taken through section L-L of FIG. 53, with the retainer in an open position and having alternate internal geometry.

FIG. 56 is another sectional view of a retainer 93, taken through section L-L of FIG. 53 and shown in an open position. In this case, an internal cantilever or intermediate panel 103 can be used to help hold cord 86 captive in the upper elbow 87 of retainer 93. It should be understood that the cord 85 could take many forms, including an electrical cord or cords for headphones, or yet any other form of cord, wire, or rope.

Figure 57:
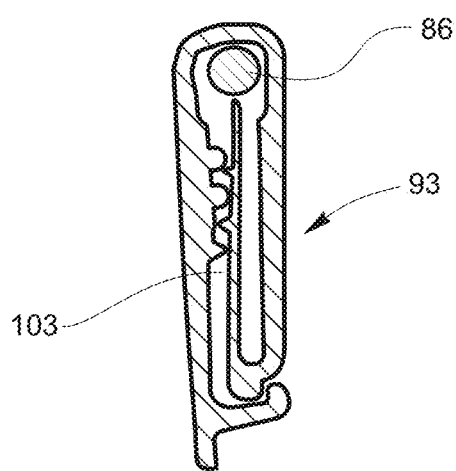
FIG. 57 is a section view of a retainer as taken through section L-L of FIG. 53, with the retainer in a closed position and having alternate internal geometry.

FIG. 57 is a section view of a retainer 93, taken through section L-L of FIG. 53 as with FIG. 56, but in which the retainer is in the closed position.

Figure 58:
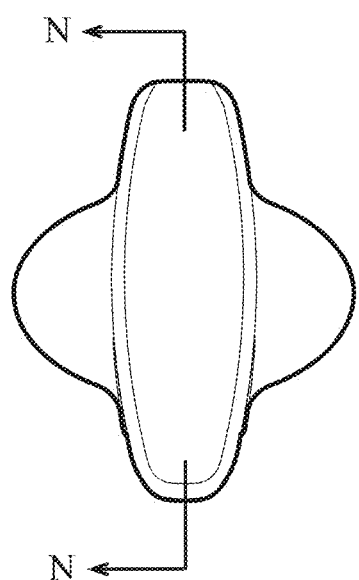
FIG. 58 is a front view of a preferred retainer.

FIG. 58 is an example front view of a retainer with section N-N labeled for use with FIGS. 59-63 wherein the front view could be the same for each of these figures and thus a single figure will be used to show the location of the section view to simplify the drawings, as the differences shown are internal surfaces and thus could share the front view.

Figure 59:
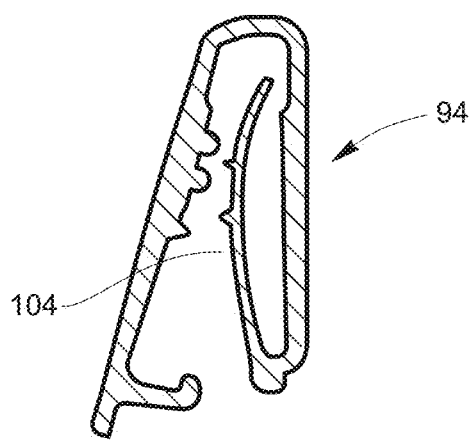
FIG. 59 is a section view of a retainer as taken through section N-N of FIG. 58, with the retainer in an open position.

FIG. 59 is a section view of a retainer 94, taken through section N-N of FIG. 58. In this version, the intermediate panel is formed as a spring beam 104. The spring beam is formed with a curvature from the bottom toward the top, bowing outward toward the front panel and away from the rear panel at the center of the spring beam, so that a spring force is applied when the retainer 94 is fastened to itself and thus this spring force can be used to more firmly hold a variety of items in the jaws of the retainer 94. The spring beam can not only provide an improved gripping force but also provide a retaining means for a belt as shown in previous figures. Grip details added as shown strategically can add to the desired gripping function.

Figure 60:
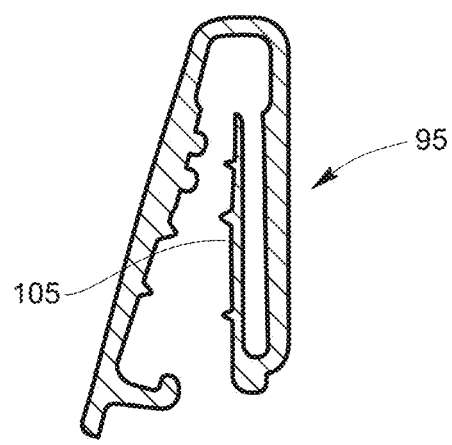
FIG. 60 is a section view of a retainer as taken through section N-N of FIG. 58, with the retainer in an open position and having alternate internal geometry.
Figure 61:
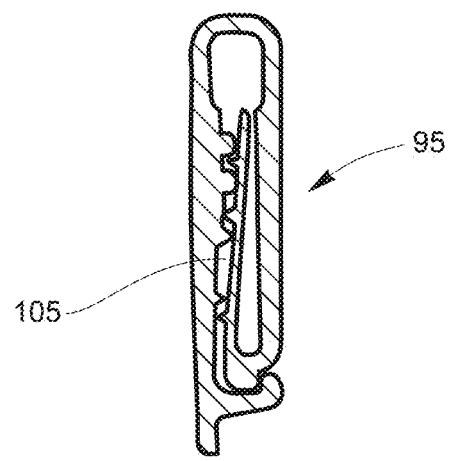
FIG. 61 is a section view of a retainer as taken through section N-N of FIG. 58, with the retainer in a closed position.

FIG. 60 is a section view of another similar embodiment of a retainer 95 taken through section N-N of FIG. 58. An intermediate panel is also provided, in the form of a spring beam 105. When the retainer 95 is in the closed position and fastened to itself as shown in FIG. 61, the deflection of the spring beam 105 can provide a desired gripping force to allow the retainer 95 to appropriately grip a variety of different items held in its jaws as well as serve as a retainer for a belt or cord as seen in FIG. 57. The nature of the spring beam as a particular embodiment of an intermediate panel can be seen in the contrast between the embodiment of FIGS. 56 and 57 as compared to that of FIGS. 60 and 61. In the former version, the configuration and location of the panels and the interior surfaces such as the protrusions leaves the size of the channel between the intermediate panel and the rear panel substantially the same in both the open and closed positions. But in the latter version, the size of the channel at the upper end of the spring beam has narrowed considerably in the closed position (that is, the position as shown in FIG. 61), thereby providing the spring force as described above.

Figure 63:
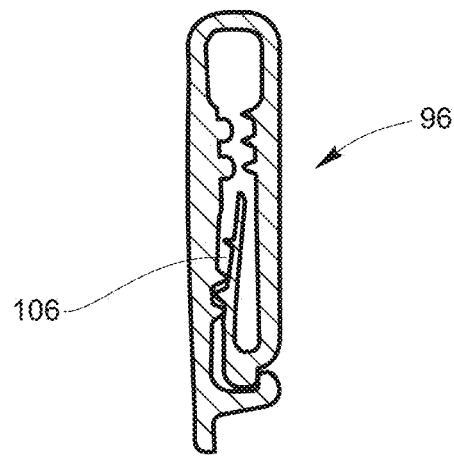
FIG. 63 is a section view of a retainer as taken through section N-N of FIG. 58, with the retainer in a closed position and having alternate internal geometry.

FIGS. 62 and 63 are section views of another embodiment of a retainer 96 through section N-N of FIG. 58, shown in the open position in FIG. 62 and in the closed position in FIG. 63. In this version, the intermediate panel is again formed as a spring beam 106, but is shorter than that of FIGS. 60 and 61.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

We claim:

1. A retainer, comprising:
    a front panel, the front panel being at least semi-rigid and having a top end and a bottom end, the front panel defining a width between the top end and the bottom end;

a rear panel, the rear panel being at least semi-rigid and having a top end and a bottom end, the rear panel defining a width between the top end and the bottom end;

a main elbow, the main elbow joining the top end of the rear panel to the top end of the front panel, the main elbow being operable as a hinge to allow the front panel to move apart from the rear panel to an open position and to move toward the rear panel to a closed position;

a lateral extension positioned on the rear panel, the lateral extension being configured as a surface on the rear panel between the top end and the bottom end of the rear panel which extends laterally beyond the width of the front panel;

a front panel tab positioned on the front panel, the front panel tab being configured as a surface on the front panel at the bottom end of the front panel and which extends beyond the width or the length of the rear panel;

an intermediate panel having a top end and a bottom end and positioned between the front panel and the rear panel;

a lower elbow, the lower elbow joining the bottom end of the rear panel to the bottom end of the intermediate panel, the top end of the intermediate panel extending toward the main elbow, wherein a channel is formed in a space between the intermediate panel, the lower elbow and the rear panel; and a latch, the latch having a retainer hook extending from the front panel and a snap receiver extending from the lower elbow, the snap receiver being selectively receivable within the retainer hook to hold the retainer in the closed position, and removable from the retainer hook to enable the retainer to move to the open position.

2. The retainer of claim 1, wherein the front panel further comprises an interior surface facing toward the rear panel and an exterior surface facing away from the rear panel, the interior surface of the front panel having one or more protrusions extending toward the rear panel.

3. The retainer of claim 2, wherein the rear panel further comprises an interior surface facing toward the front panel and an exterior surface facing away from the front panel, the interior surface of the rear panel having one or more protrusions extending toward the front panel.

4. The retainer of claim 1, wherein the front panel tab is positioned adjacent the retainer hook.

5. The retainer of claim 1, wherein the intermediate panel extends from the lower elbow to a position less than half way toward the main elbow.

6. The retainer of claim 5, wherein the front panel further comprises an interior surface facing toward the rear panel and an exterior surface facing away from the rear panel, the interior surface of the front panel having one or more front panel protrusions extending toward the rear panel, and wherein the rear panel further comprises an interior surface facing toward the front panel and an exterior surface facing away from the front panel, the interior surface of the rear panel having one or more rear panel protrusions extending toward the front panel, all of the front panel protrusions and all of the rear panel protrusions being positioned at a location above the intermediate panel.

7. The retainer of claim 1, further comprising a plurality of front panel protrusions formed on the front panel and a first through-hole formed in the intermediate panel, at least one of the plurality of front panel protrusions being positioned to extend into the first through-hole when the retainer is in the closed position.

8. The retainer of claim 7, further comprising a second through-hole formed in the rear panel, the at least one of the plurality of front panel protrusions further being positioned to extend into the second through-hole when the retainer is in the closed position.

9. The retainer of claim 8, further comprising a plurality of rear panel protrusions formed on the rear panel and extending toward the front panel.

10. The retainer of claim 7, wherein the intermediate panel defines a plane and wherein at least one of the plurality of front panel protrusions extends through the plane when the retainer is in the open position.

11. The retainer of claim 1, further comprising a plurality of front panel protrusions positioned on the front panel and a plurality of through-holes formed in the rear panel, each of the plurality of front panel protrusions being positioned to extend into a corresponding one of the through-holes when the retainer is in the closed position.

12. The retainer of claim 1, wherein the intermediate panel is bowed toward the front panel between the top end of the intermediate panel and the bottom end of the intermediate panel when the retainer is in the open position.

13. The retainer of claim 1, wherein the top end of the intermediate panel is spaced apart from the rear panel in the open position, and further wherein the front panel urges the top end of the intermediate panel toward the rear panel in the closed position.

14. The retainer of claim 1, wherein the lateral extension extends laterally beyond the width of the front panel at a first side of the rear panel and at an opposing second side of the rear panel.

15. A retainer, comprising:
a front panel, the front panel being at least semi-rigid and having a top end and a bottom end, the front panel defining a width between the top end and the bottom end;

a rear panel, the rear panel being at least semi-rigid and having a top end and a bottom end, the rear panel defining a width between the top end and the bottom end;

a main elbow, the main elbow joining the top end of the rear panel to the top end of the front panel, the main elbow being operable as a hinge to allow the front panel to move apart from the rear panel to an open position and to move toward the rear panel to a closed position;

a lateral extension positioned on the rear panel, the lateral extension being configured as a surface on the rear panel between the top end and the bottom end of the rear panel which extends laterally beyond the width of the front panel;

a front panel tab positioned on the front panel, the front panel tab being configured as a surface on the front panel at the bottom end of the front panel and which extends beyond the width or the length of the rear panel;

a belt clip attached to the rear panel and having a top end and a bottom end;

a latch, the latch having a retainer hook extending from the front panel and a snap receiver extending from the rear panel, the snap receiver being selectively receivable within the retainer hook to hold the retainer in the closed position, and removable from the retainer hook to enable the retainer to move to the open position.

16. The retainer of claim 15, further comprising a plurality of front panel protrusions formed on the front panel and a first through-hole formed in the rear panel, at least one of the plurality of front panel protrusions being positioned to extend into the first through-hole when the retainer is in the closed position.

17. The retainer of claim 16, wherein the top end of the belt clip is open and the bottom end of the belt clip is closed.

18. The retainer of claim 16, wherein the bottom end of the belt clip is open and the top end of the belt clip is closed.

19. The retainer of claim 16, further comprising:
- a lower elbow, the lower elbow joining the bottom end of the belt clip to the bottom end of the rear panel, the lower elbow being operable as a hinge to allow the belt clip to selectively move apart from and toward the rear panel; and
- an additional latch, the additional latch having an additional retainer hook extending from the belt clip and an additional snap receiver extending from the main elbow, the additional snap receiver being selectively receivable within the additional retainer hook to hold the top end of the belt hook against the rear panel.

20. The retainer of claim 19, further comprising a plurality of belt hook protrusions formed on the belt hook, at least one of the plurality of belt hook protrusions being positioned to extend into the first through-hole when the belt hook is held against the rear panel.

* * * * *